United States Patent
Tbatou

(10) Patent No.: US 8,872,395 B2
(45) Date of Patent: Oct. 28, 2014

(54) ROTARY SINGLE-PHASE ELECTROMAGNETIC ACTUATOR

(75) Inventor: Jamal Tbatou, Pontarlier (FR)

(73) Assignee: Fraen Mechatronics, LLC, Reading, MA (US)

( * ) Notice: Subject to any disclaimer, the term of this patent is extended or adjusted under 35 U.S.C. 154(b) by 624 days.

(21) Appl. No.: 12/612,627

(22) Filed: Nov. 4, 2009

(65) Prior Publication Data

US 2011/0101813 A1    May 5, 2011

(51) Int. Cl.
| | |
|---|---|
| H02K 33/16 | (2006.01) |
| H02K 21/24 | (2006.01) |
| H02K 16/04 | (2006.01) |
| H02K 5/04 | (2006.01) |
| H02K 11/00 | (2006.01) |

(52) U.S. Cl.
CPC ............... *H02K 21/24* (2013.01); *H02K 16/04* (2013.01); *H02K 5/04* (2013.01)
USPC .......... 310/36; 310/156.35; 310/89; 310/68 B

(58) Field of Classification Search
CPC ..... H02K 21/24; H02K 1/141; H02K 1/2793; H02K 33/16; H02K 2213/03
USPC .......... 310/156.32–37, 268, 89, 49.42, 49.29, 310/42.31, 36–39; 123/399; 335/272
See application file for complete search history.

(56) References Cited

U.S. PATENT DOCUMENTS

| | | | |
|---|---|---|---|
| 3,469,134 A | * | 9/1969 | Bering et al. ................. 310/164 |
| 3,476,963 A | | 11/1969 | Feldhoff et al. |
| 4,211,963 A | * | 7/1980 | Muller ...................... 318/400.41 |
| 4,629,920 A | * | 12/1986 | Hermann .................. 310/156.35 |
| 4,658,166 A | | 4/1987 | Oudet |
| 4,682,067 A | | 7/1987 | Oudet |

(Continued)

FOREIGN PATENT DOCUMENTS

| | | |
|---|---|---|
| CH | 663300 | 11/1987 |
| EP | 0175903 | 4/1986 |

(Continued)

OTHER PUBLICATIONS

"Brushless DC Motors, made to last forever", Island Components Group, Inc., no date.*

(Continued)

*Primary Examiner* — Burton Mullins
*Assistant Examiner* — Eric Johnson
(74) *Attorney, Agent, or Firm* — Reza Mollaaghababa; Thomas J. Engellenner; Pepper Hamilton LLP

(57) ABSTRACT

A single phase, rotary electromagnetic actuator comprising first and second stator assemblies, located in oppositely facing spaced apart positions along a common central axis, permits a magnetized disc magnet rotor to rotate about the common axis free of any magnetic attractive forces normally tending to move the disc magnet longitudinally along the axis, or alternatively to be located in a position to create a desired longitudinal attractive force. The entire assembly is maintained in operative positions by a circular belt which provides an inward facing lip on each side of which the stator assemblies are seated and which determines the magnetic airgap spacing for the disc. The invention may be implemented as a servo-actuator by the inclusion of an angular position sensor that uses the actuator rotor as the magnetic field emitter, and a receiver for the magnetic field and its contacts, located in the belt lip.

39 Claims, 23 Drawing Sheets

(56) References Cited

U.S. PATENT DOCUMENTS

| | | | |
|---|---|---|---|
| 4,985,652 A | | 1/1991 | Oudet et al. |
| 5,053,667 A | | 10/1991 | Oudet |
| 5,168,187 A | * | 12/1992 | Baer et al. .................. 310/49.12 |
| 5,298,825 A | * | 3/1994 | Oudet et al. ............. 310/156.45 |
| 5,334,893 A | | 8/1994 | Oudet et al. |
| 5,337,030 A | | 8/1994 | Mohler |
| 5,512,871 A | | 4/1996 | Oudet et al. |
| 5,677,659 A | | 10/1997 | Porcher |
| 5,726,829 A | * | 3/1998 | Bodmer et al. ............ 360/99.08 |
| 5,823,165 A | * | 10/1998 | Sato et al. ..................... 123/399 |
| 6,005,319 A | * | 12/1999 | Kondo ..................... 310/156.45 |
| 6,011,337 A | | 1/2000 | Lin et al. |
| 6,020,804 A | * | 2/2000 | Gandel ......................... 335/272 |
| 6,313,553 B1 | * | 11/2001 | Gandel et al. .................. 310/36 |
| 6,543,416 B2 | * | 4/2003 | Kowatari et al. .............. 123/399 |
| 6,720,688 B1 | * | 4/2004 | Schiller ........................... 310/64 |
| 6,750,748 B2 | | 6/2004 | Byram |
| 6,891,456 B2 | | 5/2005 | Byram |
| 7,009,389 B2 | * | 3/2006 | Nakano et al. ........... 324/207.25 |
| 2003/0164648 A1 | | 9/2003 | Byram |
| 2003/0173843 A1 | * | 9/2003 | Sakai et al. ..................... 310/71 |
| 2005/0001509 A1 | * | 1/2005 | Gandel et al. ................. 310/268 |
| 2006/0244330 A1 | * | 11/2006 | Hill .......................... 310/156.05 |
| 2008/0197728 A1 | | 8/2008 | Loussert et al. |
| 2009/0160392 A1 | * | 6/2009 | Mularcik ....................... 318/724 |
| 2011/0101813 A1 | * | 5/2011 | Tbatou .................... 310/156.35 |

FOREIGN PATENT DOCUMENTS

| | | | | |
|---|---|---|---|---|
| EP | 1121748 | | 8/2001 | |
| EP | 1902509 | | 1/2007 | |
| FR | 2849712 | | 7/2004 | |
| GB | 956036 | | 4/1964 | |
| GB | 2194024 | | 2/1988 | |
| JP | 2007028868 | * | 2/2007 | ............ H02K 21/24 |

OTHER PUBLICATIONS

Machine Translation JP 2007028868, Feb. 1, 2007, "stator for rotary electric machine", Kaneko et al.*
Andre, Torque-Motors as Actuators in Intake and Exhaust System, Symposium, 2009, Switzerland.
Andre, The Torque Motor, Sonceboz Move No. 5 Newsletter, 2004, Switzerland.
Angleviel, MMT Technology for Single Phase Rotary Actuators, 2008, France.
Buaillon, Limp-Home Rotary Actuators, Technical Paper, 2000, France.
International Search Report and Written Opinion for Application No. PCT/IB2010/002872, issued Apr. 18, 2012 (20 pages).
International Preliminary Report on Patentability for Application No. PCT/IB2010/002872, issued May 8, 2012 (14 pages).
European Search Report issued Mar. 6, 2013 for Application No. 10787545.2 (11 pages).

* cited by examiner

US 8,872,395 B2

ROTARY SINGLE-PHASE ELECTROMAGNETIC ACTUATOR

FIELD

The invention relates to electromagnetic actuators and servo-actuators.

BACKGROUND

Limited angle, brushless DC rotary actuators are well known and commercially available. One such actuator is disclosed in U.S. Pat. No. 5,512,871 issued Apr. 30, 1996. Another is disclosed in U.S. Pat. No. 6,313,553 issued Nov. 6, 2001.

The actuators now available and as presented by the above-identified references, are known commercially as "torque motors", and include a ferromagnetic yoke attached to a magnet comprising the rotating member. The yoke is deemed necessary in order to strengthen the rotating member sufficiently for operation, and to close the attached magnet's magnetic circuit. But the presence of a yoke results in a structure with a high moment of inertia, reducing dynamic performance, and having a single-sided stator structure which creates unbalanced magnetic forces on the rotating member attracting it toward the stator.

One drawback of such an actuator is that approximately 20% or more of the power consumption is used to move its own inertia, reducing dynamic performance. Depending on the application duty cycle, this wasteful power consumption value can be even higher.

A second drawback is that due to the unbalanced design, the rotor magnet has a magnetic attraction force toward the stator structure, which leads to the use of an expensive thrust ball bearing to perform an axial stop function yet allowing the requisite rotational freedom of the rotor. A part of this axial attraction force is useful to withstand vibration when used in certain applications, but in any case the rotor rotation is subjected to friction torque such that some of the magnetic force used to create rotation and output torque is wasted.

A third drawback is the electromagnetic flux leakage. It can be clearly understood by seeing the structure of the prior art as in FIG. 1 and FIG. 2, in that the 4 coils and stator poles are necessarily located very close to each other. Even with a small magnetic airgap between the rotor yoke and poles, when saturation appears at high currents necessary for the creation of high torque, most of the coil flux does not pass through the magnet, which would create the torque, but instead closes itself on the neighboring coil.

A fourth drawback is that in servo applications, the actuator magnet cannot be used to activate the position sensor receiver, but a second, separate magnet is required to be attached to the yoke, adding cost and weight to the rotating member.

A fifth drawback is that due to the physical space required for the construction and assembly of the stators and coils, the actual useful stroke of the prior art's 4-pole single-sided actuator is approximately 75 degrees compared to a theoretical stroke of 90 degrees, which would be preferable in most applications. Use of the prior art's 2-pole construction in the same physical actuator size could produce a 90 degree usable stroke, however the torque would be reduced by 50% rendering such an actuator undesirable and unusable in many applications. And, increasing the size of the actuator to attain the required torque would also render the actuator undesirable due to the resulting size, weight and cost.

SUMMARY OF THE INVENTION

The following definitions are applicable in describing the invention unless the context indicates otherwise, and are known and understood by those skilled in the art of motor design:

The term "stator" means a one or multi piece(s), high permeability ferromagnetic structure, which is fixed in linear or rotational motion.

The term "active stator" means a "stator" with poles and adapted to receive excitation coil windings to produce a magnetic flux.

The term "passive stator" means a "stator" that provides a path for a magnetic flux but does not incorporate any excitation coil windings. For example a "passive stator" can be high a permeability ferromagnetic plate.

The term "stator circuit" means an "active stator" plus excitation coils placed on the poles.

The term "stator assembly" means an overmolded "stator circuit" or an overmolded "passive stator".

The term "airgap" or "magnetic airgap", with notation E, means the distance between axially spaced stators absent the rotor.

The term "pole pair" means the north and south poles of a magnet.

The term "multipolar" means a magnet that has been magnetized to have more than one pole pair.

The term "rotor" or "rotor magnet" or "disc magnet rotor" means a multipolar disc magnet axially magnetized having pole pairs defined by a radial demarcation or transition line.

The term "application" means a device to which the actuator is attached and which is operated by the actuator.

The term "2 pole configuration" or "2 pole actuator" or the like means an embodiment in which there is at least a single 2 pole active stator on one side of the rotor and the rotor has two pole pairs.

The term "4 pole configuration" or "4 pole actuator" or the like means an embodiment in which there is at least a single 4 pole active stator on one side of the rotor and the rotor has four pole pairs.

The term "inertia assembly" means all the actuator parts that contribute to calculation of inertia for purposes of calculating the figure of merit AK.

The present invention in one embodiment relates to an electromagnetic actuator comprising a rotary single-phase actuator that can produce a substantially constant torque and a torque proportional to current, on a limited angular travel known as its useful stroke, said useful stroke typically between 60 degrees and 110 degrees. The actuator comprises stators including 2 or 4 poles that are axially spaced apart, facing each other and their spacing establishing an airgap and a rotor consisting of a magnetized multipolar disc magnet of 2 or 4 pole pairs in the airgap. Other features and embodiments will be described below.

In another embodiment, there is an active stator on one side of the rotor and a passive stator on the other side of the rotor.

The end points of the travel of the application to which the invention is connected, whether rotary or linear, are mechanically connected to the appropriate beginning and end points of the actuator's useful stroke. The rotation of the actuator can also be limited to its useful stroke by internal stops. Applications of the actuator use its output torque to provide direct rotary motion, or may use a rotary-to-linear mechanism such as a cam and follower or crank and slider to convert the rotary motion's torque to a linear motion force.

The invention produces a constant torque and a torque proportional to current over its useful stroke with equal or higher torque and faster dynamic response time, in a substantially equivalent size to actuators of the prior art. In one embodiment a 90° constant torque proportional to current, over a 90° useful stroke is available. In other embodiments a shorter stroke with constant torque is available.

The invention finds particular application in controlling various automotive applications, such as air control and exhaust gas recirculation valves, and turbocharger vanes and waste gates.

The invention is based on the realization that use of a stator on opposite sides of the rotor can enable greater dynamic effect than in the prior art in an equivalent size and space and avoid the problems seen in the prior art. In accordance with the principles of this invention, rather than attaching the rotating magnet to a ferromagnetic yoke, the yoke is eliminated. Two stationary, high permeability ferromagnetic magnetic stator assemblies, oppositely facing on either side of the rotor, are used. The use of stator assemblies on each side of the disc magnet rotor eliminates the ferromagnetic yoke utilized in the prior art.

When at least one stator assembly is energized, actuator torque is achieved because of the affect of the stator assembly' interaction with the rotor's magnetic field. In one embodiment the stator assemblies are alike; however embodiments with unlike stator assemblies are also useful as described below.

The invention utilizes an airgap E between the closest surfaces of the axially spaced apart oppositely facing stator assemblies with the disc magnet rotor in the airgap defining a spacing $e_1$ and $e_2$ on either side of the disc magnet rotor. In one embodiment, $e_1=e_2$. However, as will be seen in the following description, there are times when it is beneficial to have unequal spacing such that $e_1 \neq e_2$.

In a magnetic structure such as this invention, there are "static" axial magnetic forces attracting the rotor magnet to the stator on each side, when there is no current applied to the stator excitation coils and also when the coils are energized. When current is applied to the coils, the coils are energized thereby generating their magnetic fields, and the interaction of those fields with the field of the rotor magnet creates the torque to rotate the shaft and drive the application.

Management of the axial forces between the rotor magnet and the adjacent stator assemblies on each side is a feature of the invention. The static axial magnetic forces acting between the rotor magnet and the stator assemblies are determined by the type of stator assembly used on each side of the rotor, and/or the axial location of the rotor in the airgap E. In some applications such as automotive applications, it may be desirable to introduce an axial "pre-load" force on the shaft to help counteract axial vibrations. The introduction of such a biasing force is easily accomplished in this invention either by locating the rotor slightly closer to one stator assembly, or using two somewhat dissimilar stator assemblies to exert unbalanced axial forces to bias the rotor toward one stator assembly. The introduction of such a biasing force does not reduce the output torque of this invention.

In an embodiment of the invention the positions of the stator assemblies on each side of the rotor is provided by a non-magnetic circular wrapping belt which has an inward-facing lip, which may be continuous or discontinuous, having a width equal to the magnetic airgap E. The lip has bearing surfaces against which the stator assemblies are seated thus allowing easy actuator assembly, and resulting in high dimensional precision, as well as low production cost. Thus, the magnetic airgap E is defined by the width of the inward-facing lip of the belt.

In an alternative embodiment, the stator assembly on one side of the rotor can be a suitable high permeability ferromagnetic plate (a passive stator) of a thickness which is chosen to close the magnetic circuit. If a high permeability ferromagnetic plate is used, the amount of actuator torque is reduced from that provided by the embodiments having active stators on each side of the rotor since there are no coils on the plate for creating additional magnet flux.

As described above the stator circuits are similarly overmolded in a non-magnetic material to make the stator assemblies, and along with the rotor and shaft, are assembled and connected by the aforementioned non-magnetic circular wrapping belt.

However, in another embodiment, in order to create an integrated stator assembly, the overmolding of a first stator circuit also incorporates on the base side of the stator circuit, commonly molded with the normal overmolding, portions of the belt that serve to allow attachment and spacing of the other stator assembly. The belt and a lip bearing surface along with mounting ears is commonly molded with the overmolding on the pole face side of the stator circuit to define the integrated stator assembly. There can be 2, 3, or 4 mounting ears, respectively spaced apart at 180°, 120°, or 90° as part of the common molding as well as other features of the belt that may be desired. In this embodiment, after assembling the rotor and shaft into the integrated stator assembly, the second separately overmolded stator assembly is seated against the belt's lip bearing surface to define the magnetic airgap E, again allowing easy assembly, high dimensional precision, and low production cost.

The non-magnetic wrapping belt and the spacing lip may contain an embedded rotor position sensor receiver, locating the sensor proximate to the actuator's magnetic airgap E, to receive varying magnetic field information utilizing the actuator rotor's magnetic flux. In this embodiment, the actuator rotor magnet either has a non-circular cross section, e.g. elliptical, in order to present a varying airgap and thus a varying magnetic field for the sensor, or has a particular magnetization pattern on its edge. This embodiment eliminates the need for locating a second emitter magnet and sensor receiver, with their attendant cost and space penalties, at one end of the actuator shaft.

Given the foregoing, the following basic description of a two-pole rotary actuator with two active stators according to the invention is provided. The output torque of the actuator is developed by applying the principles of the Lorentz Force Law, known to those skilled in the art of motor design. The rotor magnet is magnetized axially through its thickness. The magnetization is realized with a magnetizing head. The stator poles are wound with copper or aluminum magnet wire, but in opposite winding directions, so when energized, poles of different polarities will be induced in each stator assembly. A stator assembly is located on each side of the rotor being axially spaced apart and facing each other to define the airgap in which the rotor resides. When energized, the facing poles of the stator assemblies on each side of the rotor are of opposite polarity and each rotor magnet pole will be facing an opposite polarity stator pole. The magnetic flux created by the energized coils interacts with the magnetic flux of the rotor magnet to create the output torque of the actuator.

With a two pole design, the invention will have a total stroke of 180 degrees and within that stroke will be a 90 degree period where the torque is constant and proportional to the applied current. This is the useful area for control of various applications such as automotive air control valves, exhaust gas recirculation valves, and automotive variable geometry turbochargers and wastegates.

The invention can also be implemented in a 4 pole configuration, with 4 poles on at least one stator assembly having alternating polarity and 4 pole pairs in the rotor of alternating polarity. With a 4 pole design, the total stroke will be 90 degrees with a useful, constant torque and proportionality period of 50 degrees.

The rotor magnet, while high strength to withstand shock and vibration forces, has low inertia compared to prior art designs utilizing a ferromagnetic yoke. The employment of stator assemblies on each side of the rotor providing a concentrated magnetic flux to interact with the rotor provides high output torque. Thus, the dynamic performance of this invention is superior to prior art designs and provides much more precise control of the application to which it is applied along with more torque.

Other embodiments of the invention provide a means in the form of a belt with a lip to establish the airgap distance.

Other features and embodiments of the invention will be described below.

BRIEF DESCRIPTION OF THE DRAWINGS

FIGS. 14a and 14b show the operation of a 2 pole embodiment of the invention in which FIG. 14a shows the ready position at −45° from the middle of the stator pole and FIG. 14b shows the final position when the coils are energized, at +45° from the middle of the stator pole.

FIGS. 18a-18c are views of an embodiment of the invention using 2 asymmetric stator structures in which FIG. 18a is a perspective view of the assembled apparatus; 18b is a perspective view of one the asymmetric stator structures of FIG. 18a and FIG. 18c is a perspective view of the other asymmetric stator structure of FIG. 18a.

DETAILED DESCRIPTION OF THE INVENTION

Figure 1:
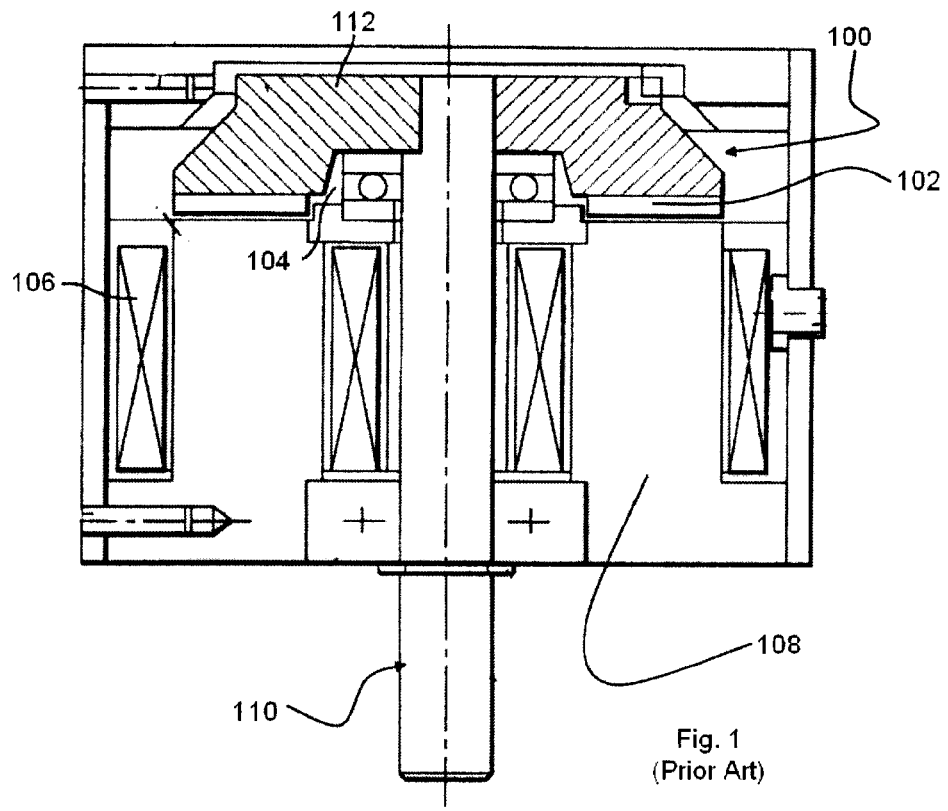
FIG. 1 is a cross-section view illustrative of a prior art actuator.
Figure 6:
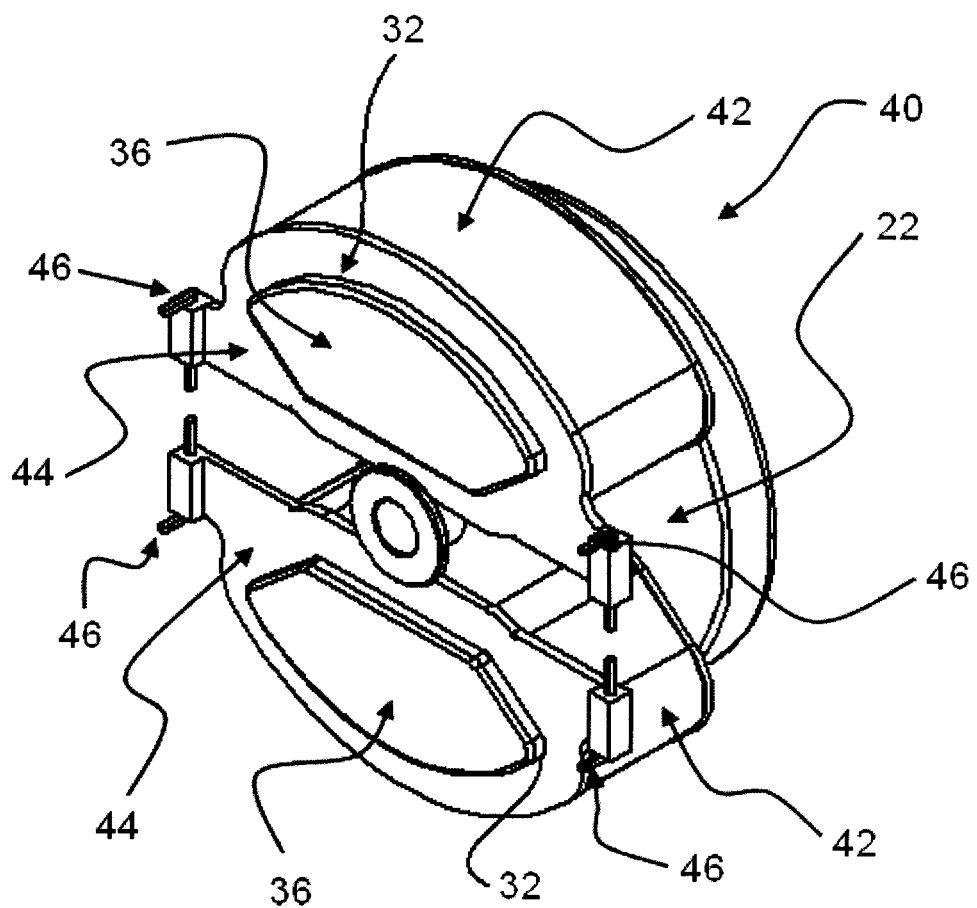
FIG. 6 is a perspective view of an exemplary stator circuit of the present invention.

FIG. 1 is a cross section of an illustrative prior art actuator taken from FIG. 6 of U.S. Pat. No. 5,512,871. The actuator consists of a magnetized disc 102 which is glued to a ferromagnetic yoke 112 and thus constitutes the movable device 100, which is connected to a coupling shaft 110. The stationary part 108 comprises a stationary stator assembly. A thrust ball bearing 104 is necessary to limit the axial movement of the moveable device 100 toward the stationary stator assembly 108. It is to be noted that the yoke rotates with the magnetized disc and thus introduces the problems mentioned above with respect to the prior art such as in U.S. Pat. No. 5,512,871 issued Apr. 30, 1996 and U.S. Pat. No. 6,313,553 the contents of which are incorporated in their entirety herein for all purposes.

Figure 2:
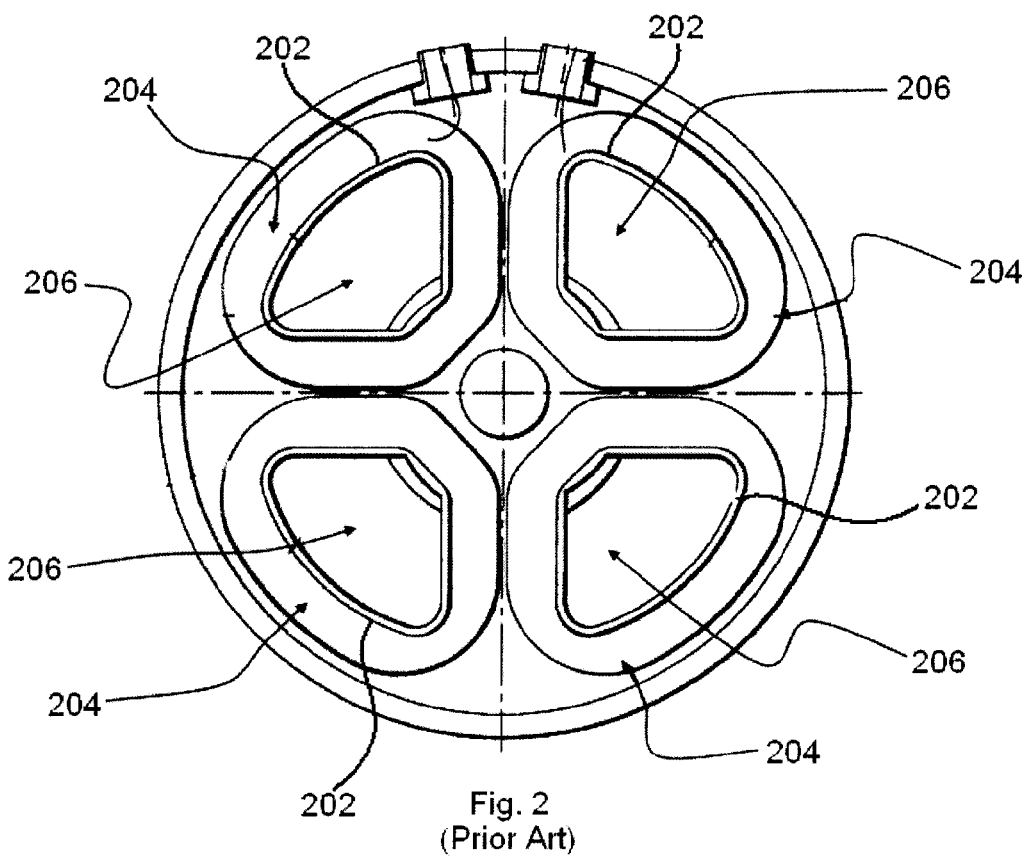
FIG. 2 is a view of a prior art stator, pole and coil configuration.

FIG. 2 is a view of a prior art stator circuit and shows the stator poles 206 mechanically pressed into a stator base 200. The four stator poles 206 each have a pole shoe 202 at the level of their heads in order to reach the maximum angular travel as close as possible to the ninety degree theoretical travel, which in the case of this prior art actuator is approximately only 75 degrees. The electric supply coils 204 used for generating the magnetic flux for the actuator are placed on each of the four stator poles 206. When saturation appears at high currents for the desired creation of high torque, most of the coil 204 flux does not pass through the rotor magnet, which would create the torque, but instead closes itself on the neighboring coil 204.

Figure 3:
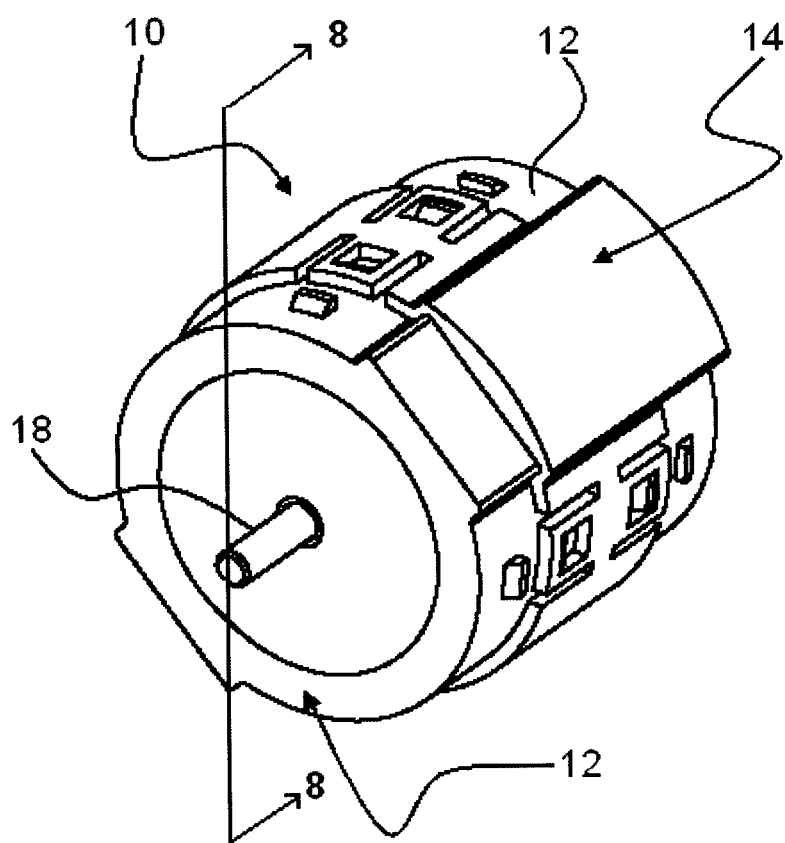
FIG. 3 shows a perspective view of an exemplary actuator of the present invention.

FIG. 3 shows a general view of the actuator 10 in an embodiment in accordance with the principles of this invention. The actuator comprises first and second like overmolded stator assemblies 12 and a coupling belt 14 and other components all as further described in FIG. 4.

Figure 4:
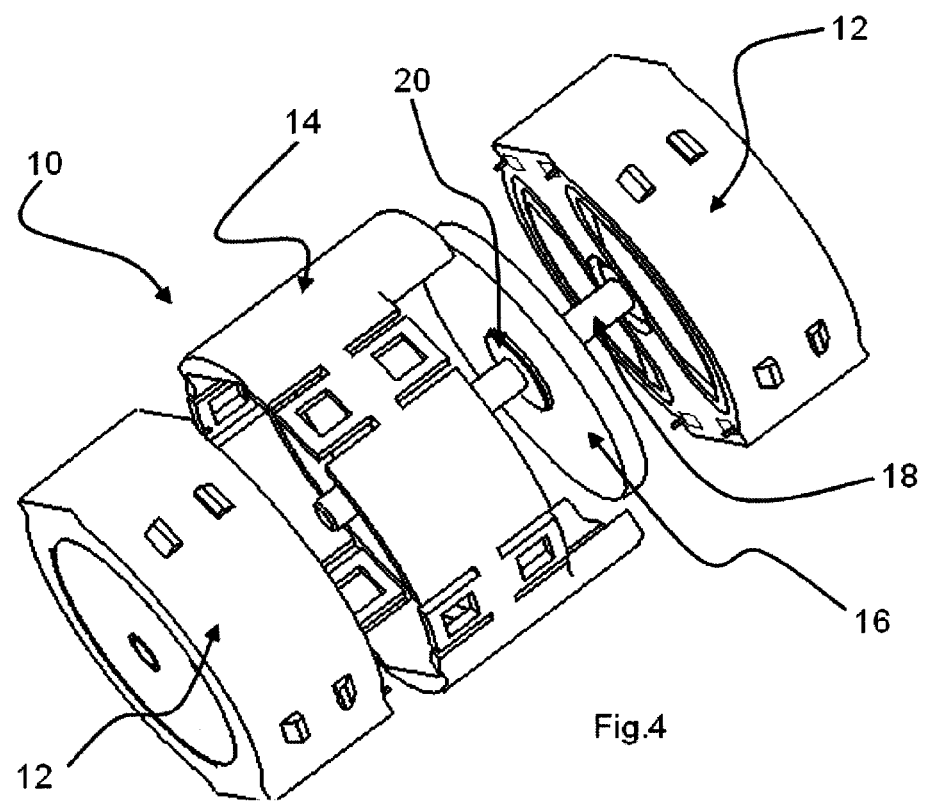
FIG. 4 is an exploded view of exemplary components for the present invention.
Figure 8:
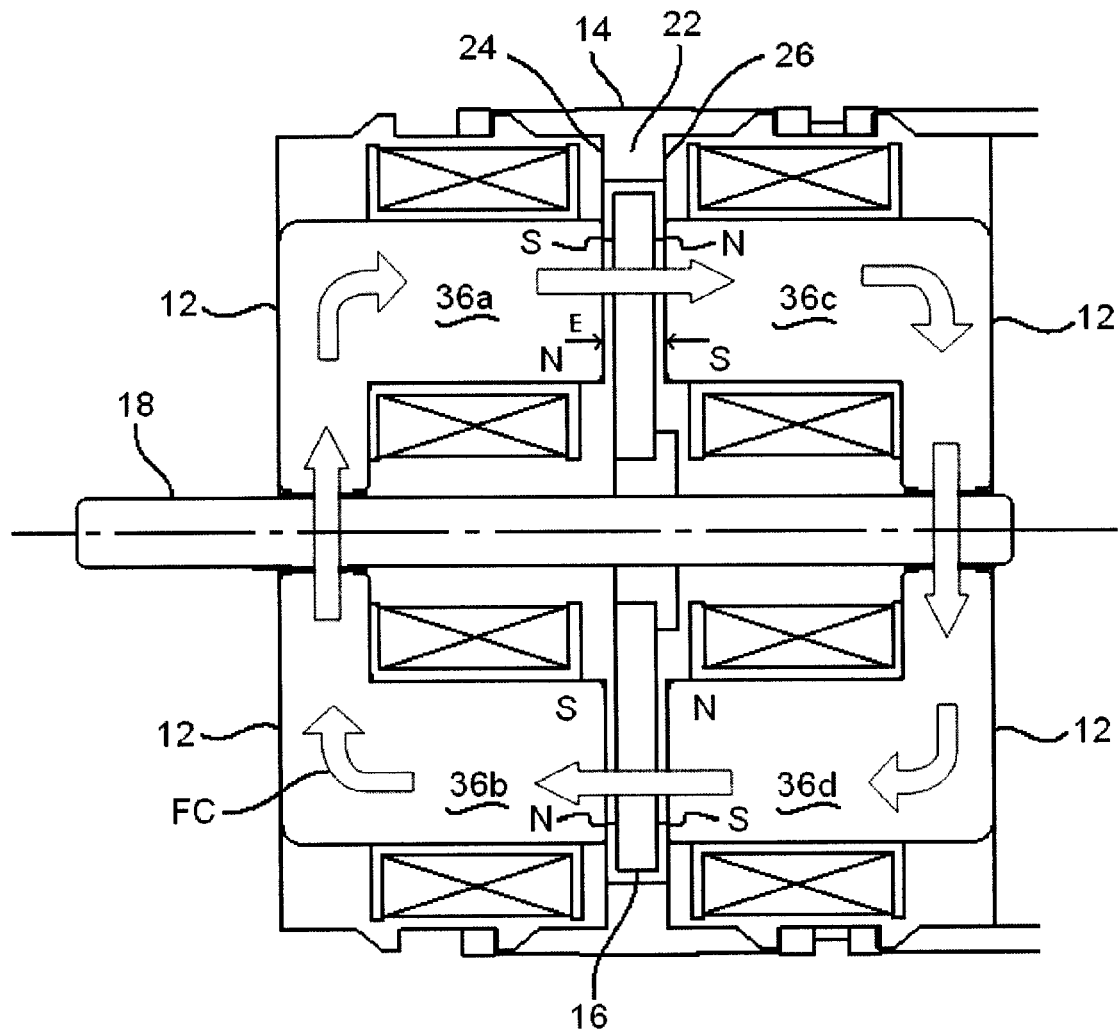
FIG. 8 is a cross section view through 8-8 of FIG. 3.
Figure 11:
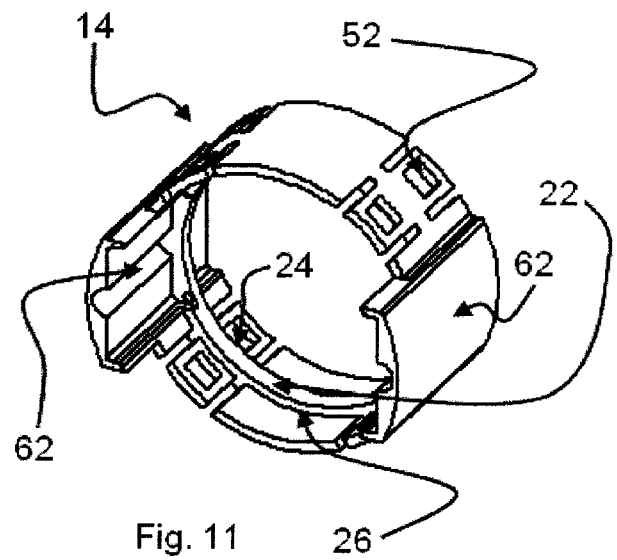
FIG. 11 is a perspective view of the coupling belt.
Figure 12:
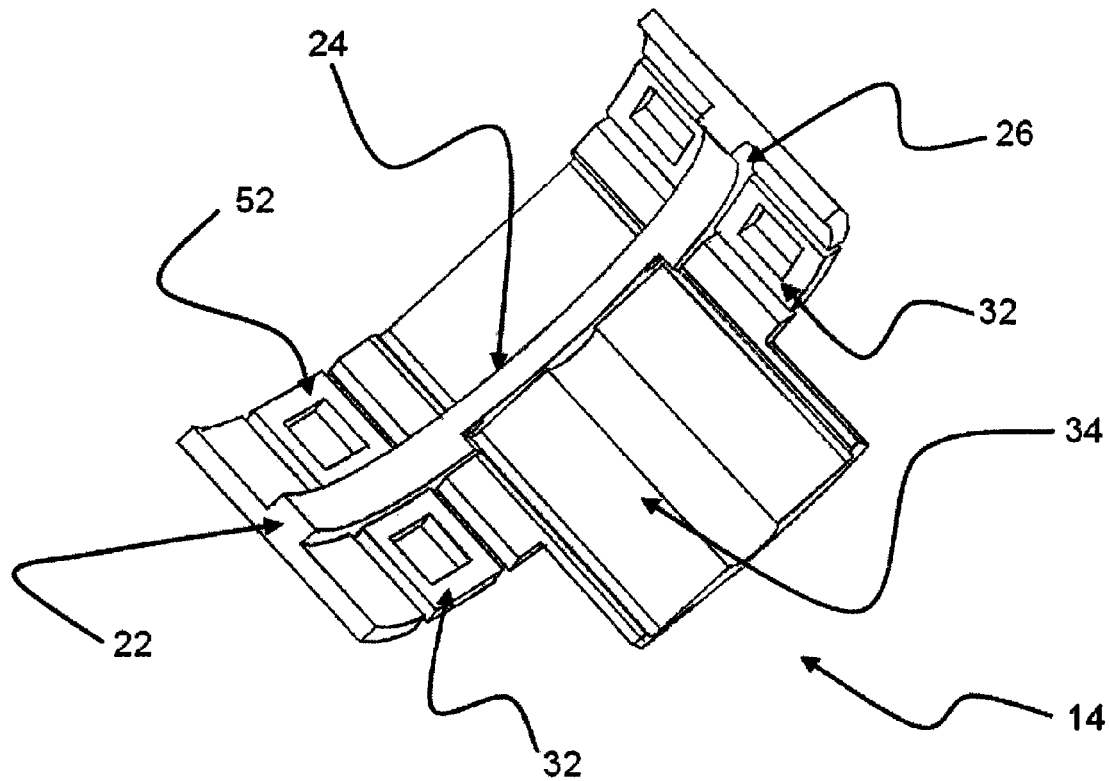
FIG. 12 is partial perspective view of the stator coupling belt.

FIG. 4 is an exploded view of an exemplary embodiment of the present invention 10. The actuator comprises first and second overmolded stator assemblies 12, a coupling belt 14 and a magnetized disc rotor 16. Disc rotor 16 is attached to shaft 18 by coupling member 20 to apply its rotation to the shaft. The rotor 16 is located in an airgap between the two stator assemblies 12 defined by the coupling belt 14 by an inward facing lip 22 and bearing surfaces 24 and 26 which are illustrated in FIGS. 8, 11 and 12. The first and second bearing surfaces 24 and 26 against which both stator assemblies 12 are seated defines the airgap E. Coupling belt 14 in one embodiment is configured as a sufficiently rigid circular belt as will become clearer hereinafter. It has cutout ears 28 with openings for engaging clips as will be described below. The stator assemblies 12 are positioned in the belt from opposite directions and seat on the corresponding bearing surfaces 24 and 26, as shown, in a manner which defines a magnetic airgap E for disc magnet rotor 16 which is positioned with respect to the bearing surfaces 24 and 26. The dimension e1 and e2 are the distances from the stator pole end faces 36 (see FIG. 5) to the facing surface of the rotor. In typical embodiments, disc magnet rotor 16 is located in the center of the magnetic airgap E equally spaced from the stator assemblies, that is, e1 equals e2. It is understood that the shaft 18 is axially fixed with respect to the stator assemblies 12, and that the rotor 16 is also axially fixed and coupled on the shaft 18 so that when the unit is assembled the rotor 16 is in an axially fixed position within the magnetic airgap E. In typical applications, the rotor 16 will be maintained without any net axial force due to the symmetry of the magnetic forces provided by equal spacing and axially symmetrical like stator assemblies on each side of the rotor. However, in certain applications of the invention such as when there is a vibration environment, it may be advantageous to introduce an axial force on the rotor 16 to resist vibration in one direction and thereby to help maintain the application's load in its axial location. To resist vibration in one direction, the location of disc magnet rotor 16 on the shaft 18 can be axially adjusted, toward either stator assembly 12, to provide the desired axial force on the rotor 16, with no reduction of output torque. Another means for inducing an axial force on the rotor 16 is described below with reference to FIGS. 18a-18c. This adjustment of the axial force on the rotor can be implemented in both the 2 pole and the 4 pole configuration.

It is to be noted that in the applications for which this invention is intended, a high dynamic response capability is an important requirement in order to position the application in as short a time as possible. A measure of the ability of the actuator to produce the required torque and to position the application to its commanded position is provided by the use of figures of merit, and herein, a figure of merit AK is defined which has an absolute numerical value equal to or greater than about 1,000 and is calculated by the ratio of Motor Steepness divided by Motor Inertia $J_m$, where Motor Steepness is equal to the square of the Motor Constant $K_m$.

$$AK = \frac{\text{Motor Steepness}}{\text{Motor Inertia}} = \frac{\text{Motor Constant}^2}{\text{Motor Inertia}} \geq 1,000$$

$K_m$ describes the motor's ability to produce output torque based on input electrical power and is an intrinsic figure of merit useful to compare different motors. $K_m$ is proportional to the ratio of output torque (T) to the square root of input power (W), i.e.

$$K_m = \frac{T}{\sqrt{W}}.$$

$J_m$ is the sum of the rotor 16 inertia and the shaft 18 inertia and the coupling member 20 inertia as can be seen in FIG. 4. Motor constant $K_m$, Motor Steepness, Motor Inertia $J_m$, Torque T and input power W are terms and figures of merit known to those skilled in the art of motor design.

An exemplary actuator of a 2 pole configuration as described herein may be constructed with parameters as in Table 1 to provide the figure of merit AK at least equal to 1,000. In the example given:

$$AK = \frac{(1.73 \times 10^{-1})^2}{1.85 \times 10^{-5}} = 1,618$$

TABLE 1

| Torque Motor comparison | | PRIOR ART | INVENTION |
|---|---|---|---|
| Magnet remanence | (T) | 1.2 | 1.2 |
| Torque constant = Kt | (Nm/A) | | 0.243 |
| Terminal resistance | (Ohms) | | 1.98 |
| Motor constant = Km peak | (Nm/W$^{1/2}$) | 1.50E−01 | 1.73E−01 |
| Rth | °C./W | | 2.50 |
| Continuous torque @ 25° C. and 12 V | (Nm) | | 1.221 |
| Continuous torque @ 130° C. and 12 V | (Nm) | | 0.430 |
| Peak torque @ 130° C. and 12 V | (Nm) | | 0.906 |
| Stroke | (°) | 75 | >90 |
| Electrical time constant | (ms) | 9.5 | 4.3 |
| Inertia | (kg.m$^2$) | 6.50E−05 | 1.85E−05 |
| Mechanical time constant | (ms) | 2.9 | <1 |
| Diameter | (mm) | 60 | 60 |
| total height | (mm) | 50 | 72 |
| total weight | (g) | 640 | 550 |
| Magnet weight | (g) | 46 | 50 |
| Iron weight stator | (g) | 340 | 360 |
| Iron weight rotor | (g) | 140 | 0 |
| Copper weight (all coils) | (g) | 60 | 80 |

Figure 5:
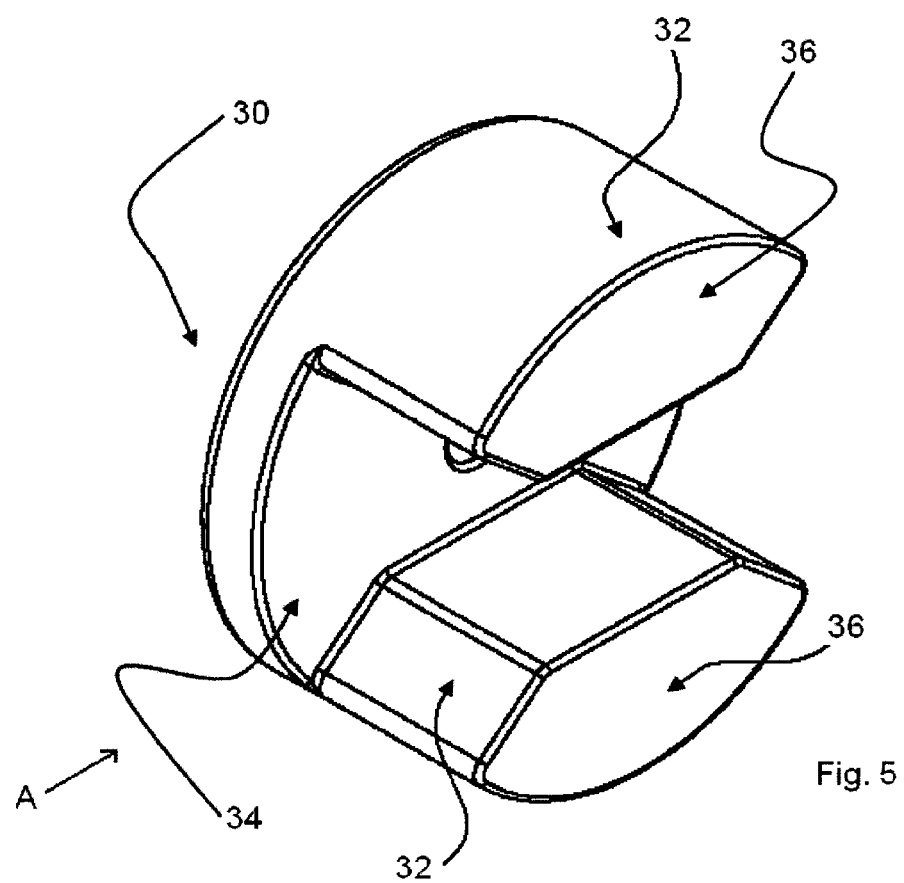
FIG. 5 is a perspective view of an exemplary stator structure of the present invention.

FIG. 5 is a view of the stator structure 30 of the present invention which advantageously may be made by the sintered powder metal process. In this exemplary version, the stator structure 30 has two poles 32 and a base 34. The poles 32 have end faces 36. The stator structure 30 defines a U-shaped configuration.

FIG. 6 is a view of a stator circuit 40 of a 2 pole configuration of the present invention showing coils 42 wound on molded bobbins 44 and terminated in pins 46 to provide access for electrical connection. The bobbins 44 are mounted on the poles 32 of the stator structure 30.

Figure 7:
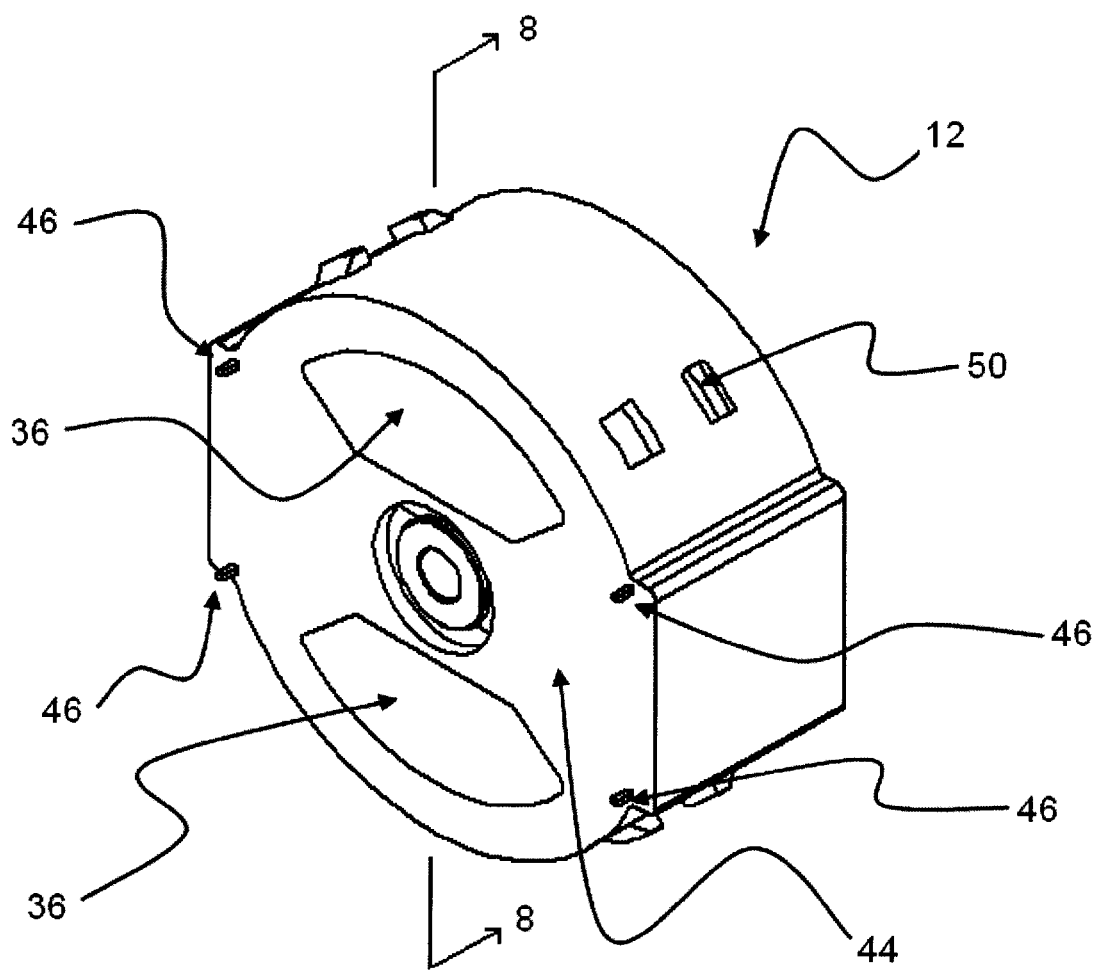
FIG. 7 is a perspective view of an exemplary overmolded stator assembly of the present invention.

FIG. 7 is a view of the overmolded stator assembly 12 of the present invention for a 2 pole configuration. In this view stator pole end faces 36 and coil connections 46 are visible.

The overmolding material 44 may be a thermoplastic polymer of the Liquid Crystal Polymer (LCP) type, a commercial example being Zenite, or a thermoplastic polyamide formulation, commercially known examples being Stanyl and Zytel. The overmolding 44 makes it possible to provide a mechanical connection of the overmolded stator assembly 12 with the belt 14 or a cover 48 (FIG. 13) by the presence of fastener elements in the form of protruding grippers or clips 50 on which mating fastener elements in the form of cutout ears 52 (FIG. 11) of the coupling belt 14 or the cutout ears 54 of the cover 48 (FIG. 13) are fastened. While the mating fasteners hold the parts together, it is the lip 22 (FIGS. 11 and 12) that defines the precise dimension of the airgap E. The airgap E is the distance between facing stator pole end faces, or between stator pole end faces on one side and a passive stator on the other side of the rotor as will be described in more detail below. In the present embodiment, because the overmolding is coplanar with the stator pole end faces, the dimension E is determined by the width of the lip 22 having its bearing surfaces 24 and 26 bearing on the overmolding of the stator assemblies. In any configuration the width of the lip may be adjusted to ensure that the dimension E is the distance between pole end faces or pole end faces and a passive stator as the case may be. It should be noted that in addition to the mechanical connection of the stator assemblies 12 with the coupling belt 14, there is a magnetic axial force between the stator assemblies 12 and the rotor 16 which contributes to holding the actuator 10 together and in particular to cause the stator assemblies 12 to firmly seat on the bearing surfaces 24 and 26 of the lip 22.

FIG. 8 is a cross section view through 8-8 of FIG. 7. In this view, the U-shape of the cross section through the stator poles 36 is evident. The magnetic airgap E is determined by engagement of the lip sides 24 and 26 with the overmolded stator assemblies 12. The magnetic flux circuit FC flows efficiently through the stators.

Figure 9:
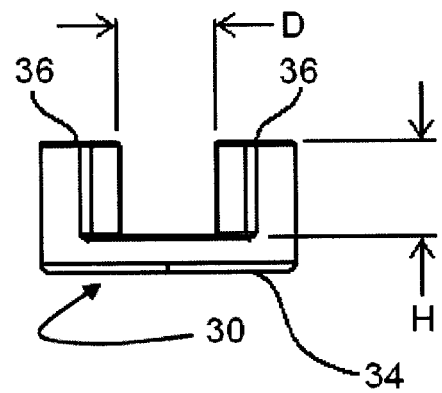
FIG. 9 is a schematic side view from arrow A of FIG. 5 of the stator structure.

FIG. 9 is a schematic view along arrow A of FIG. 3 of the stator structure 30 showing the U-shaped cross section and defining key dimensions D and H. Dimension D is the spacing between the poles 36 and is in the range of about 2 to 5 times the magnetic airgap E, and preferably is about 4 times the magnetic airgap E providing sufficient spacing to prevent electromagnetic flux leakage between the energized coils. Dimension H is the height of the stator pole 36 above the base 34 and is less than about 8 times the magnetic airgap E and preferably about equal to or less than 6 times the magnetic airgap E allowing the energizing coil to have sufficient copper volume for operation of the invention.

It is also to be noted that prior art rotary actuators may also be equipped with angular position sensors. This type of configuration is often called a servo-actuator. Such a sensor requires an additional magnet mounted on the rotating yoke and a sensor receiver attached to the actuator cover. A feature of actuators in accordance with the principles of this invention is the absence of the additional magnet. A sensor receiver is located in a position in the belt 14 in energy coupling relationship to the magnetized disc magnet rotor 16 as is discussed below.

Figure 10A:
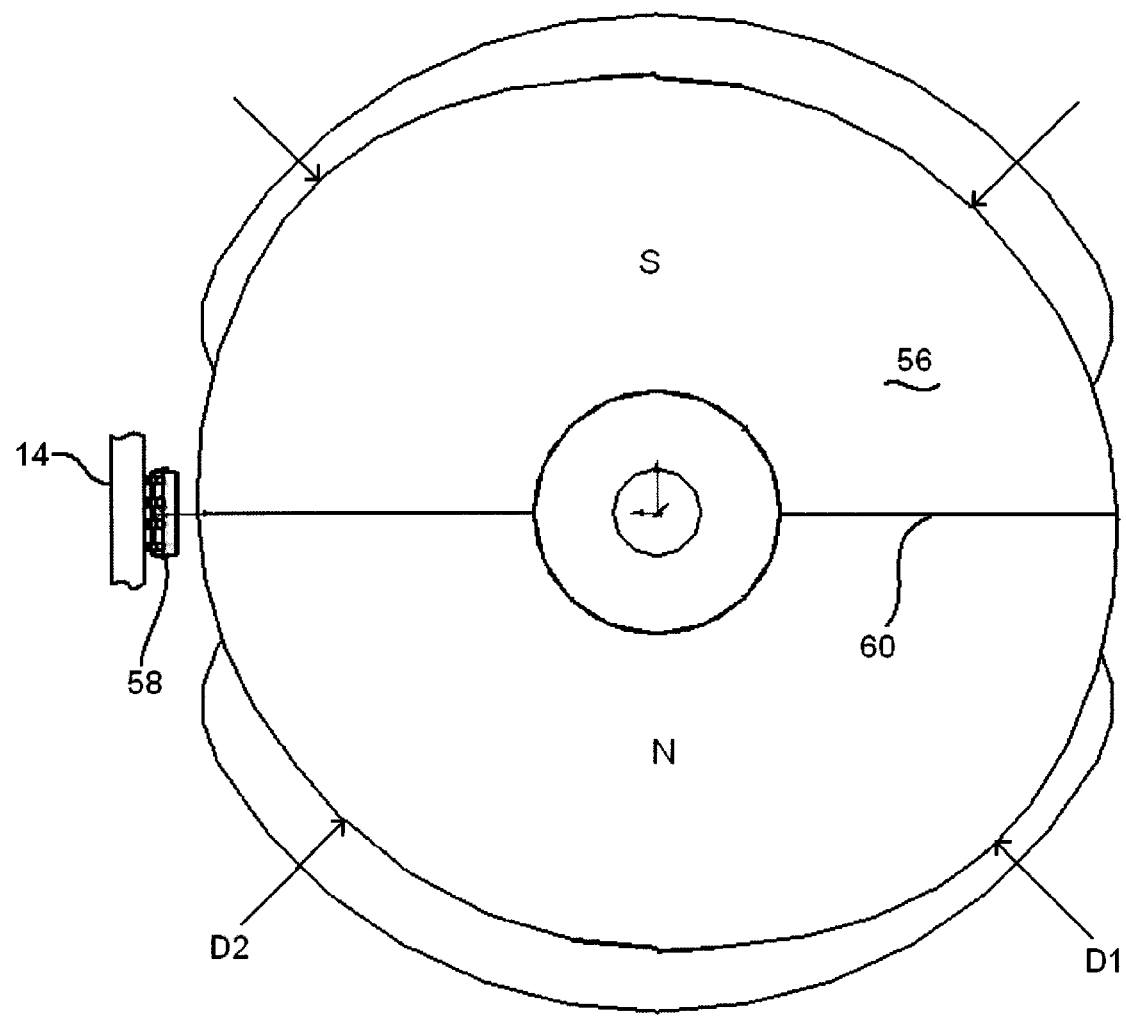
FIG. 10a is a view showing a non-circular rotor magnet as the magnetic emitter with a sensor receiver located in the belt to determine rotor angular position.

FIG. 10*a* is view showing a non-circular magnet rotor 56 functioning as the magnetic emitter for the sensor receiver 58 to determine rotor angular position. The sensor 58 is mounted in the belt 14. The use of a non-circular, for example elliptical, rotor creates a varying distance between the rotor 16 and the sensor receiver 58 whereby the consequent varying magnetic field strength information is utilized to determine angular position information. The non-circular configuration is illustrated by the dimension D1 being greater than the dimension D2.

Figure 10B:
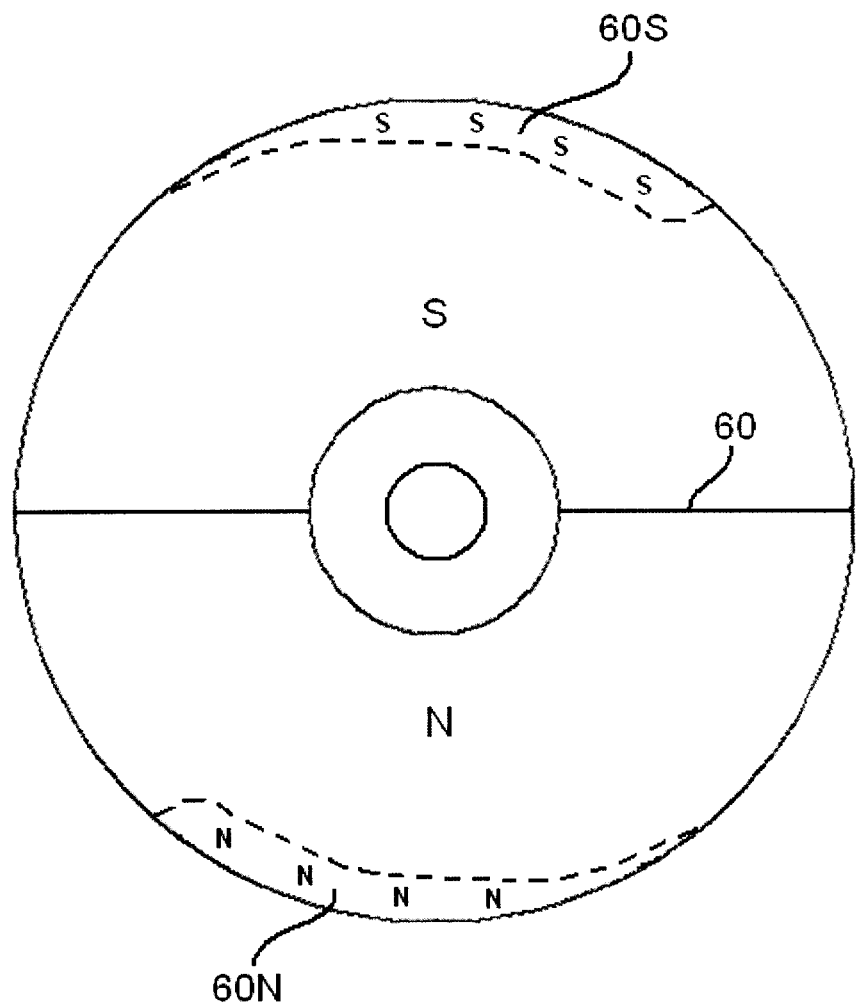
FIG. 10b is a schematic view showing a portion of the rotor having varying magnetization along a peripheral portion as the magnetic emitter with a sensor receiver located in the coupling belt to determine rotor angular position.

FIG. 10*b* is another way to provide the varying magnetic flux signal to the sensor 58. In this embodiment, a portion 60N and 60S of each pole is magnetized with a progressively or discretely varying changing magnetic field strength as the magnetic emitter so that the sensor 58 receives the varying flux as a varying signal, the dash lines schematically depicting the variation.

Figure 22:
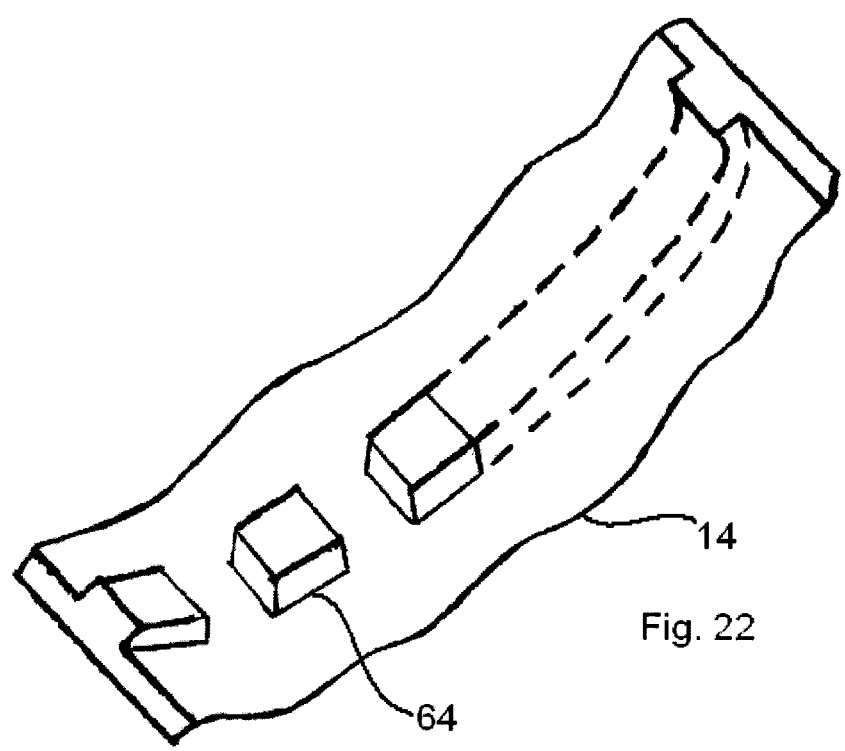
FIG. 22 is a partial view of an embodiment in which the spacing lip is discontinuous.

FIGS. 11 and 12 are views of the belt 14. The belt material may be of a thermoplastic polyester, such as DuPont Crastin PBT. The central lip 22 spaces the stator assemblies 12 apart to fix the magnetic airgap E as seen in FIG. 8. Cutout ears 52 are used to clip onto grippers 50 of the stator assemblies 20. Electrical connections to the stator circuit coil pins 46 are carried out in the areas 62. If a sensor receiver 58 is mounted in the belt 14, areas 62 may also be used for its electrical connections. The lip 24 is shown as a continuous element, but it could be discontinuous so long as there are enough portions of the surfaces 24 and 26 to maintain the airgap E. This is illustrated in FIG. 22 in which lip segments 64 are spaced apart.

Figure 13:
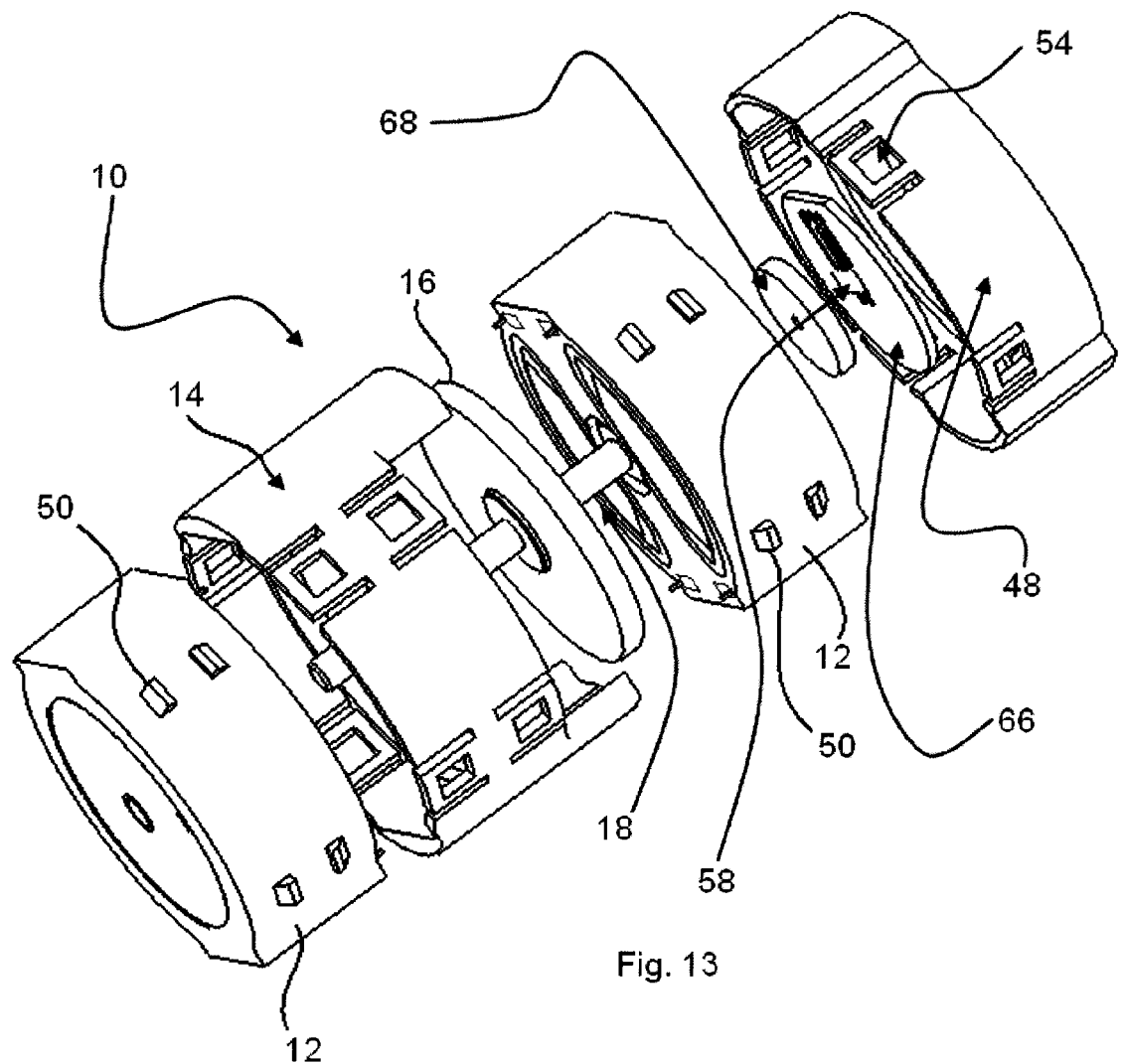
FIG. 13 is an exploded perspective view of an embodiment of the present invention where the rotary position receiver is mounted to a printed circuit board or lead frame in the cover and a magnetic field emitter is mounted to the shaft.

FIG. 13 is an exploded view of another embodiment of the present invention 10 where the angular position receiver 58 is mounted to a printed circuit board or leadframe 66 in the cover 48 and a magnetic field emitter 68 is mounted to the end of shaft 18. Cutout ears 54 mechanically fix the cover 48 to the stator assembly 20 by clipping onto grippers 50.

Now the Operation of the Actuator Will be Described.

Figure 14A:
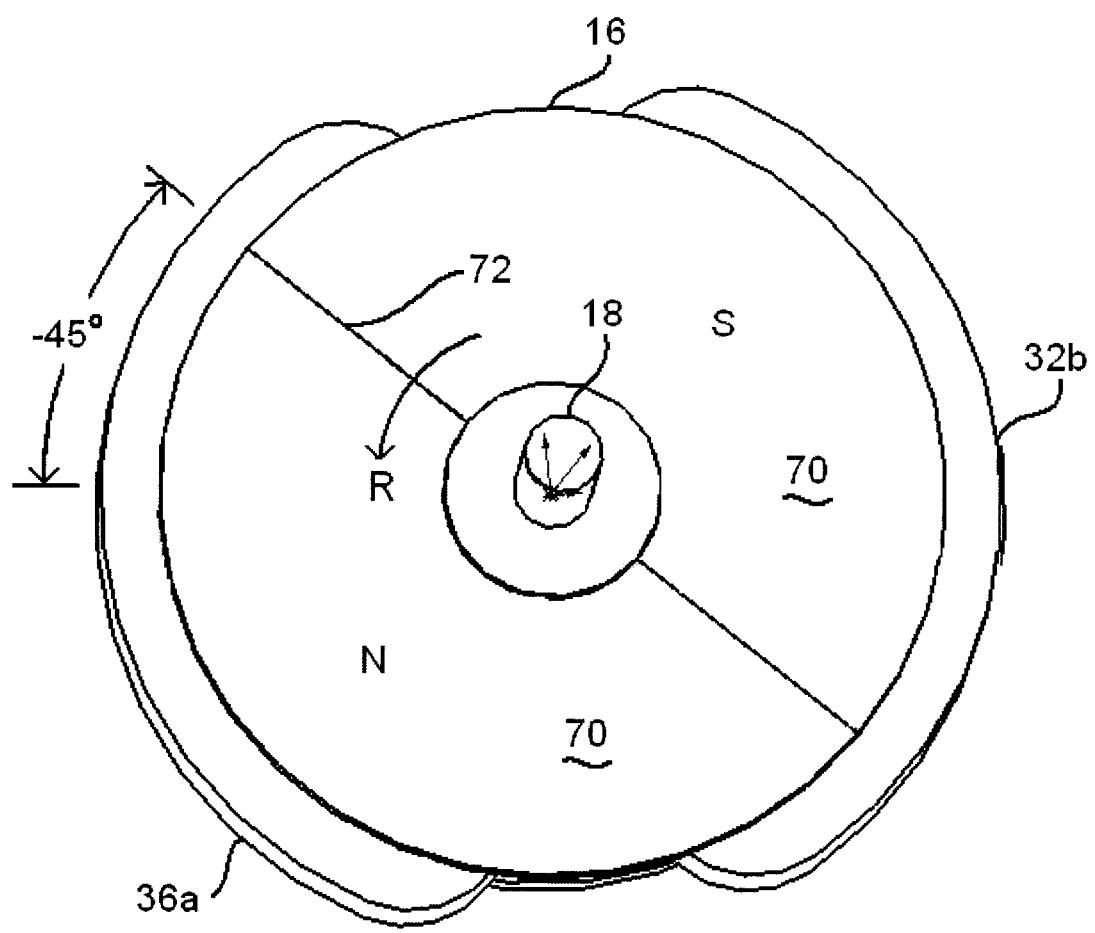
Figure 14B:
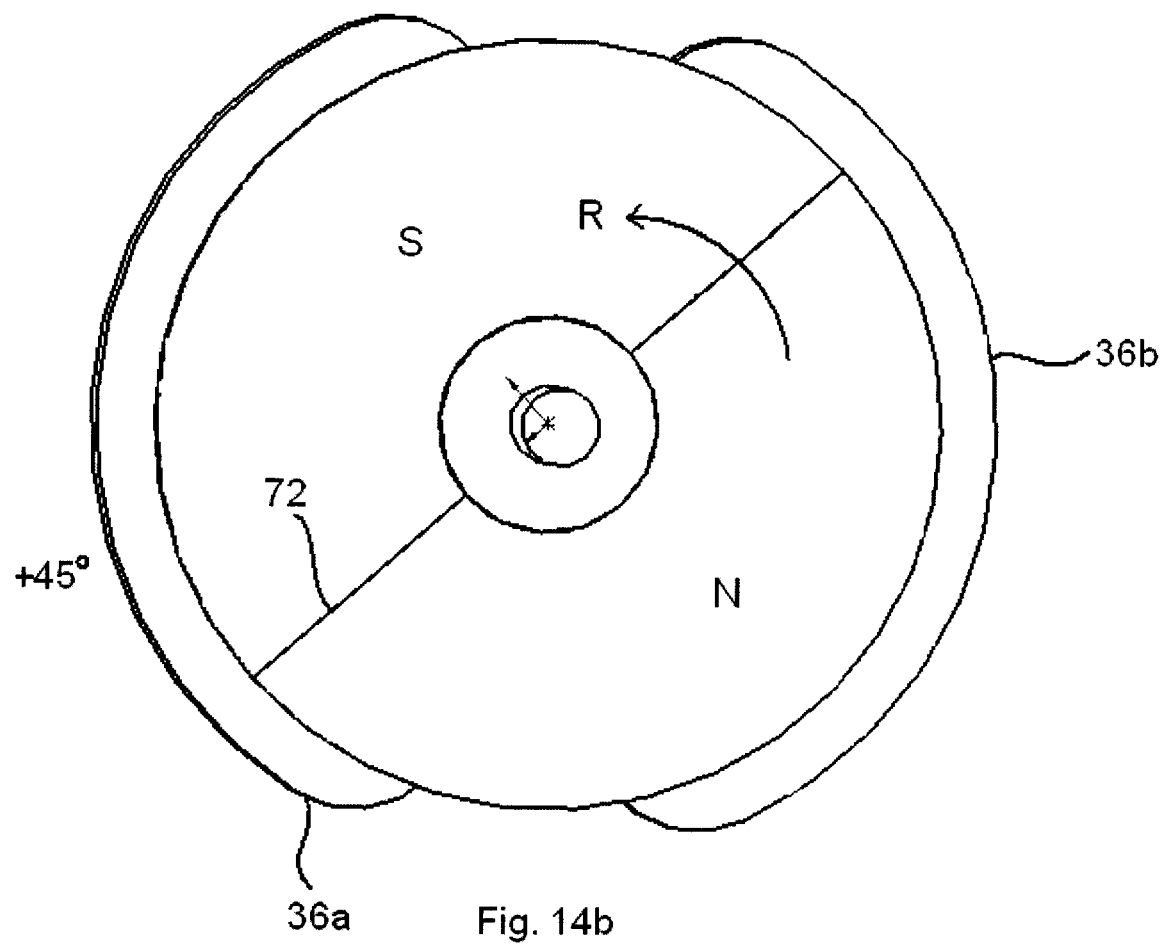

FIGS. 14*a* and 14*b* show schematic views of the magnetic poles of the stators 36*a* and 36*b* and the two pole pairs 70 of rotor 16 in the various operating positions for a 2 pole configuration. The demarcation or transition of the magnetic pole pairs in the rotor 16 is shown at 72. In FIG. 14*a* the rotor 16 is in a ready position relative to the stators 36*a* and 36*b*, which in an initial ready state are not energized. The ready position is at nominally −45° to the center of the pole 36*a*. The rotor 16 is at one end of its useful stroke because of its connection to one extreme position of the user application, e.g. an air valve "fully open". As seen in FIG. 8, to operate the actuator the stators 36*a* and 36*b* will be energized as N and S poles respectively and the stators 36*c* and 36*d* will be energized as S and N poles respectively. That will cause the rotor to rotate in the direction of the arrow R. This will rotate the shaft 18 to operate the user application. FIG. 14*b* shows the position of the rotor 16 after rotation to the other end of its useful stroke, to a final position at nominally +45° to the center of the pole 36*a* which is the other extreme position of the application, e.g. an air valve "fully closed". If the current is removed from the coils, a mechanical means such as a spring may be employed to cause the actuator to return to the first ready position. Typically the application equipment will provide the return spring, although the actuator can have it built-in.

Figure 15:
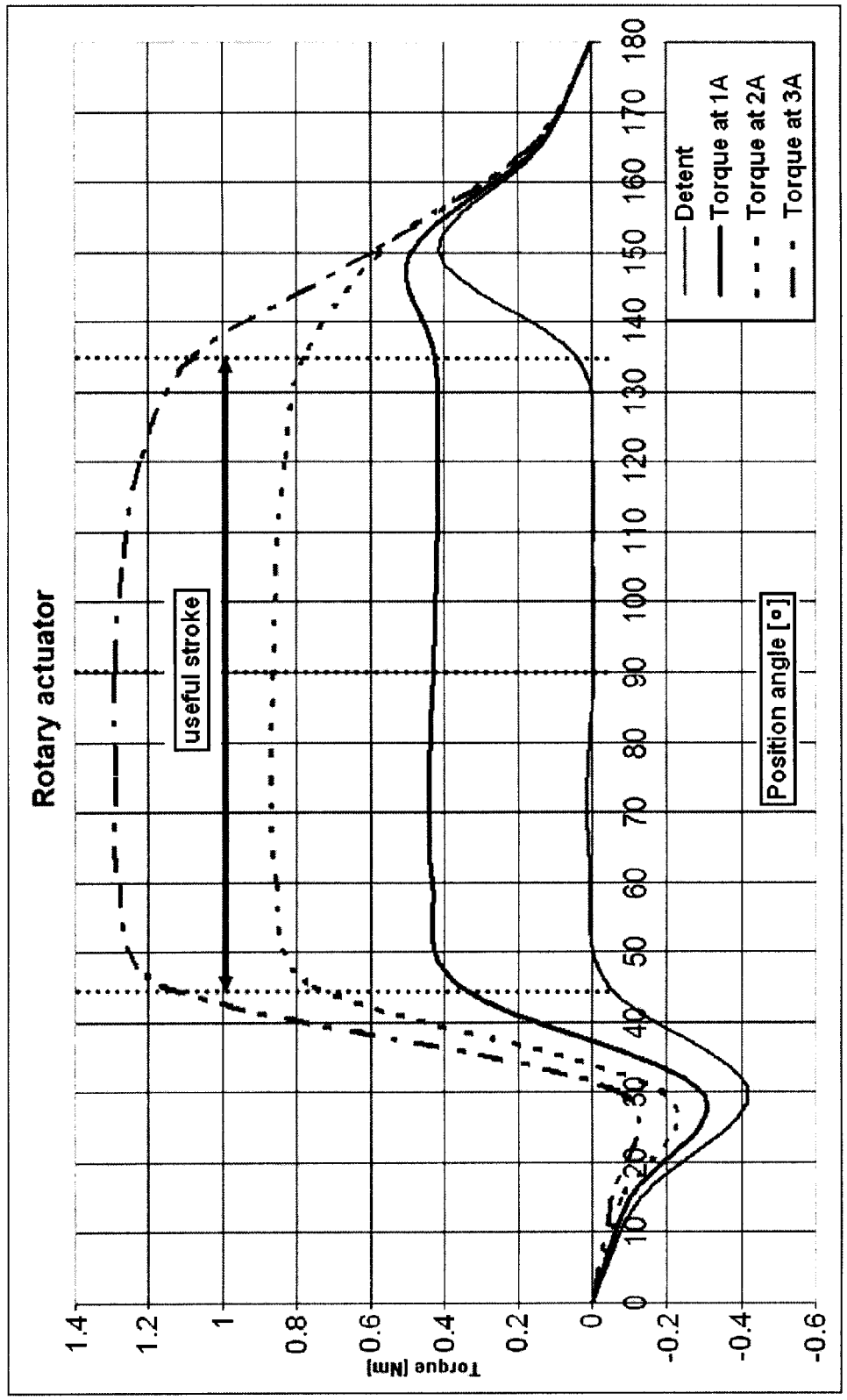
FIG. 15 is a graph of the torque curves for a 2 pole embodiment of the invention.

FIG. 15 is a graph of a 2 pole rotary actuator according to the invention that is, 2 stator poles on each side of the rotor and the rotor having 2 pole pairs. In the graph, the 90° useful stroke has substantially constant torque, and the torque is proportional to the applied current, and in the art is taken as a constant torque actuator.

Figure 16A:
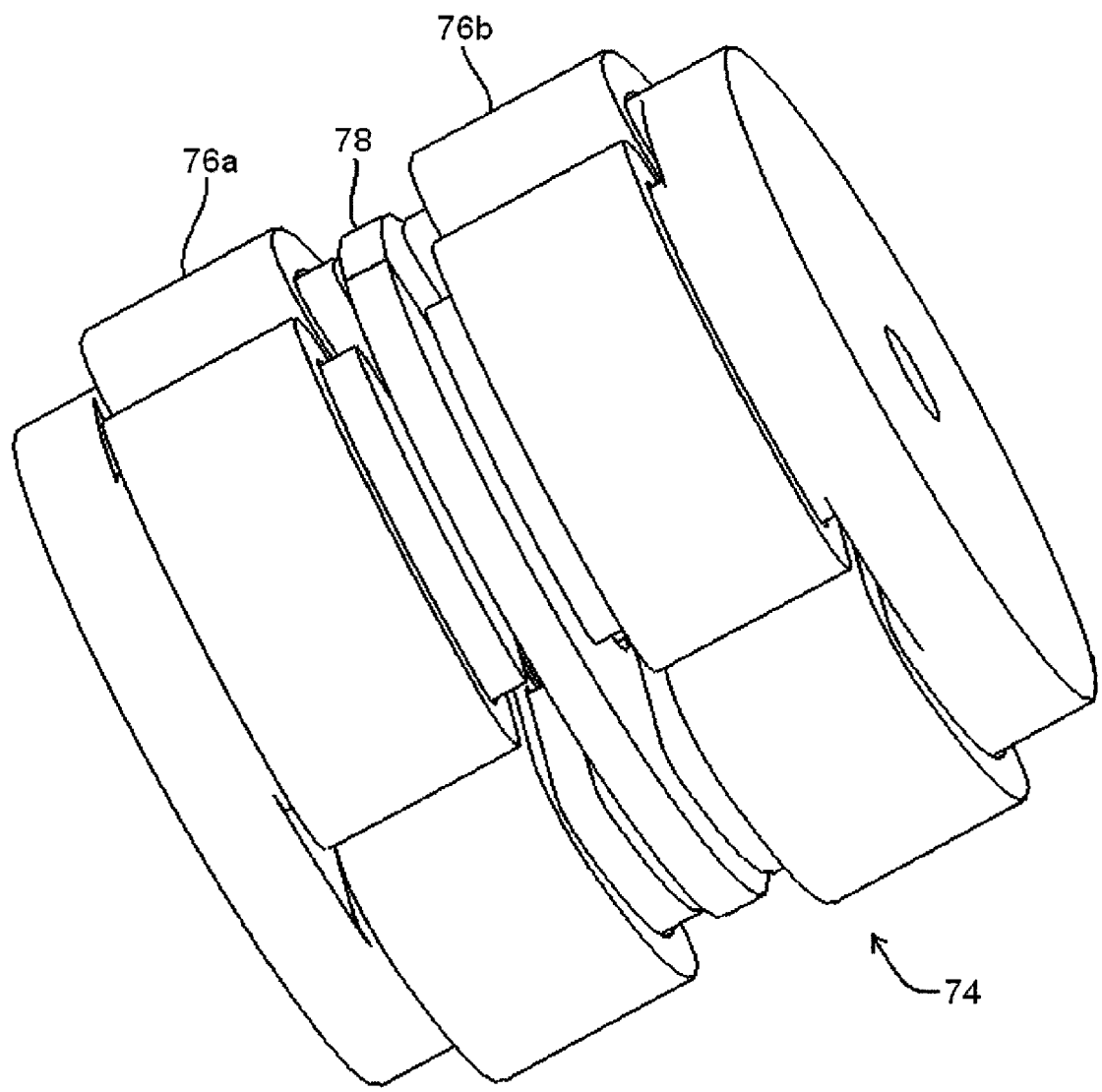
FIG. 16a-16c show views of a 4 pole embodiment of the invention in which 16a is a perspective view; 16b shows the ready position at −25° from the middle of the stator pole; 16c shows the final position when the coils are energized, at +25° from the middle of the stator pole.
Figure 16B:
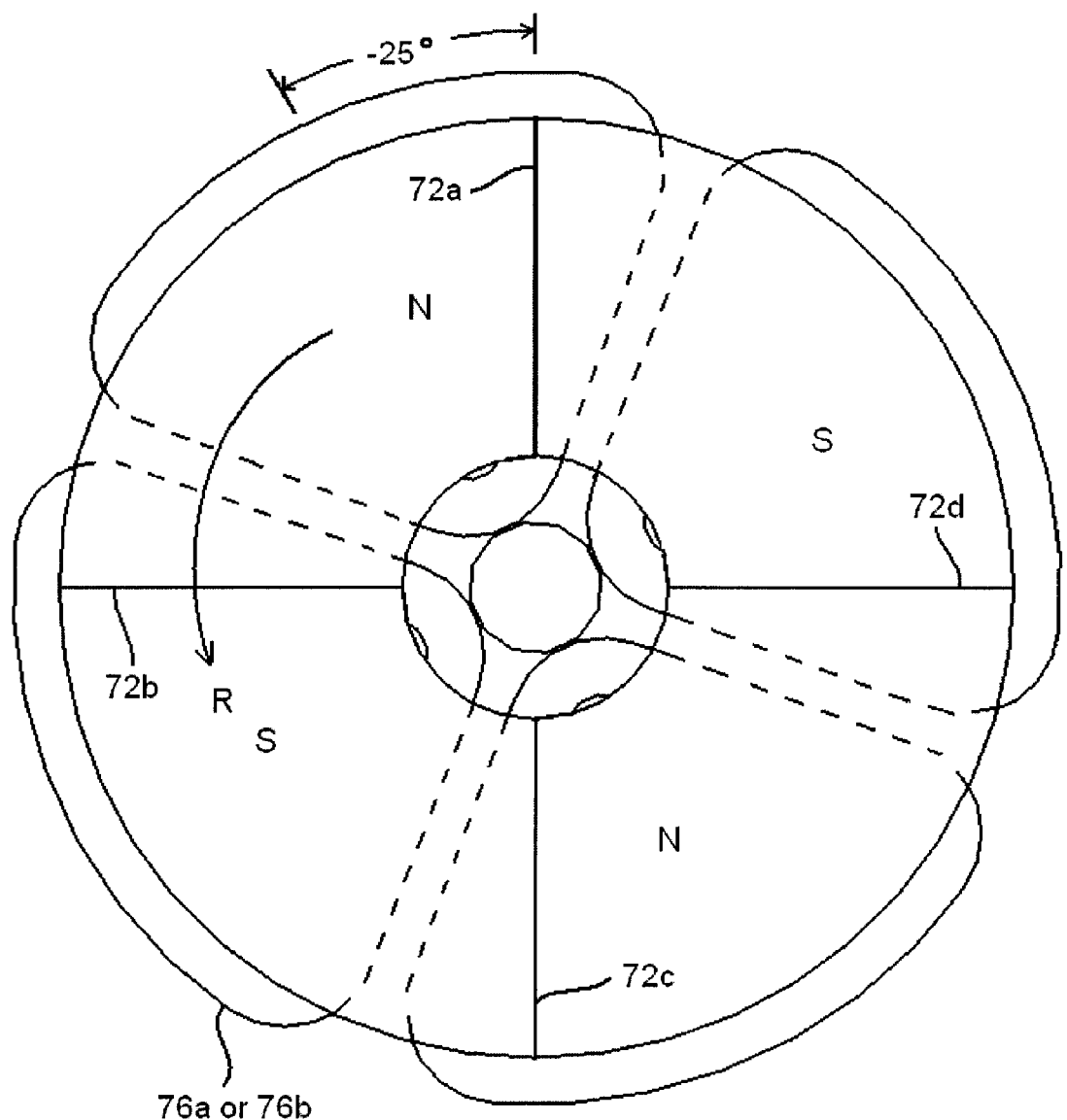
Figure 16C:
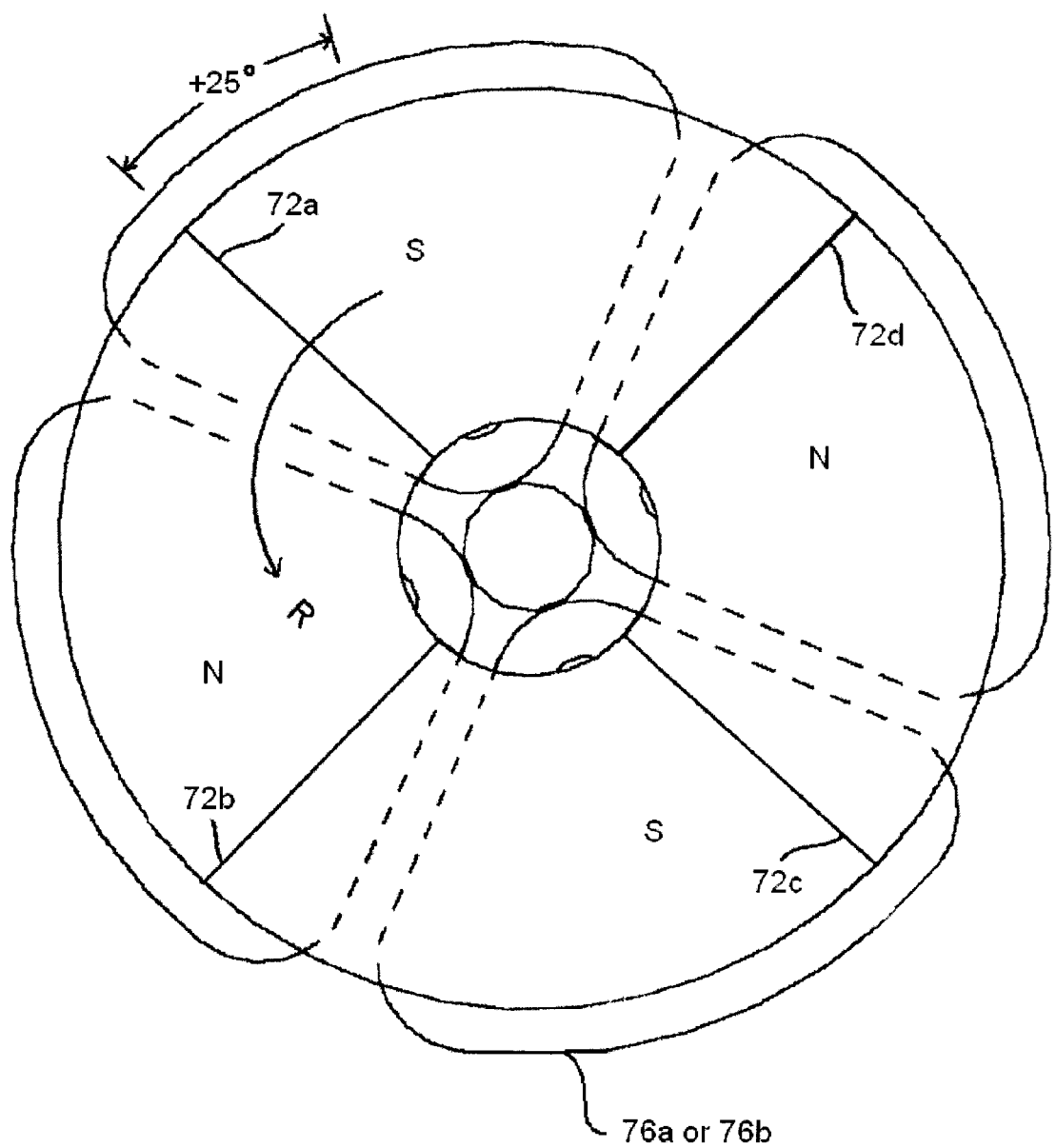

FIGS. 16*a*-16*c* illustrate a 4 pole configuration 74 of the invention; that is 4 stator poles on each of the stator assemblies 76*a* and 76*b* on each side of the rotor 78 and the rotor 78 having 4 pole pairs. Although the belt 14 is not shown in this figure, when installed it would define the airgap space E. FIG. 16*b* shows the start position for the 4 pole configuration, at nominally −25° from the center of the stator pole, and FIG. 16*c* shows the final position at nominally +25° from the center of the stator pole. Typically the 4 pole configuration has a useful stroke for constant torque of approximately 50 to 65 degrees.

Figure 17:
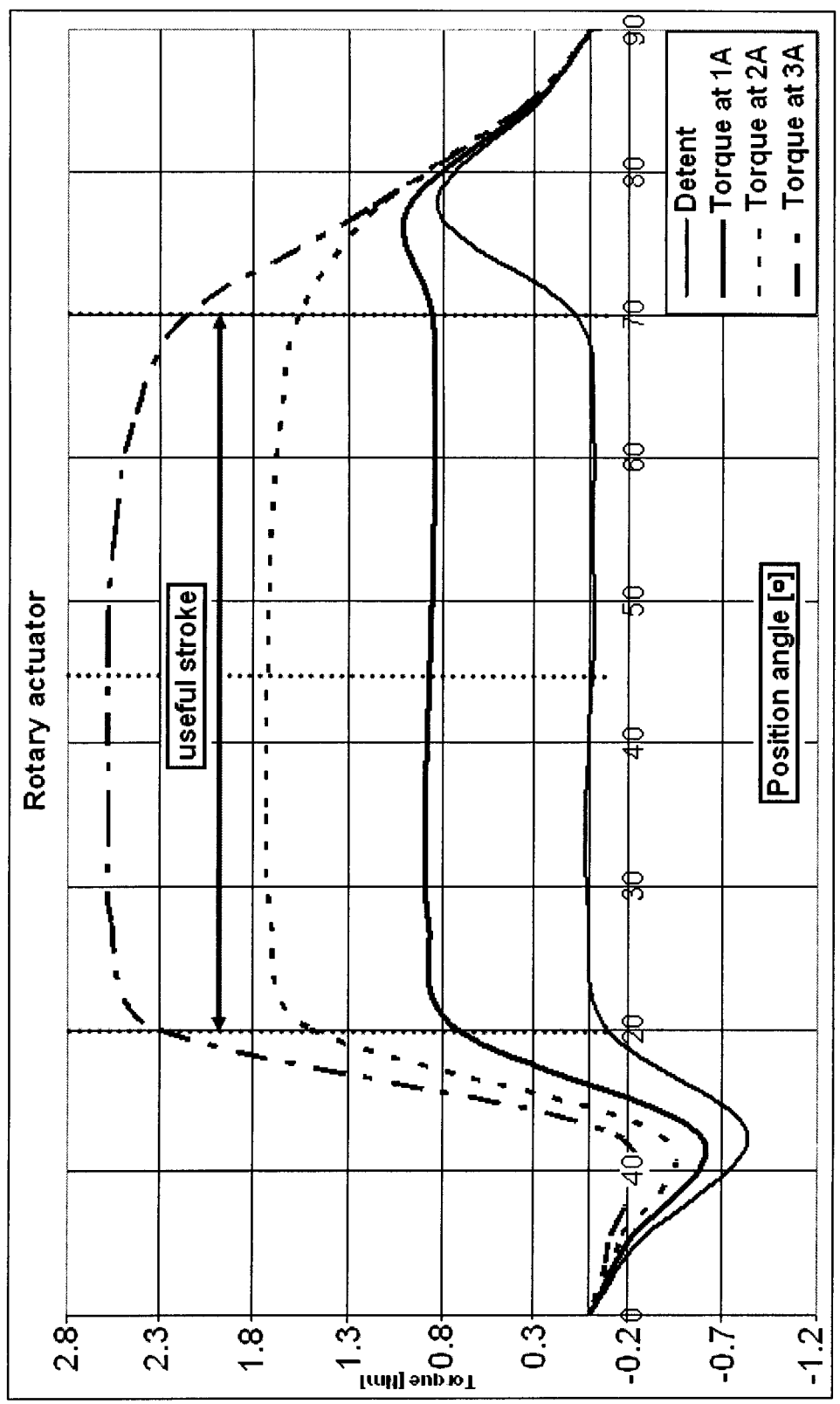
FIG. 17 is a graph of the torque curves for the 4 pole embodiment of the invention

FIG. 17 is a graph of a 4 pole rotary actuator according to the invention. In the graph a 50° useful stroke of constant torque is depicted.

Figure 18A:
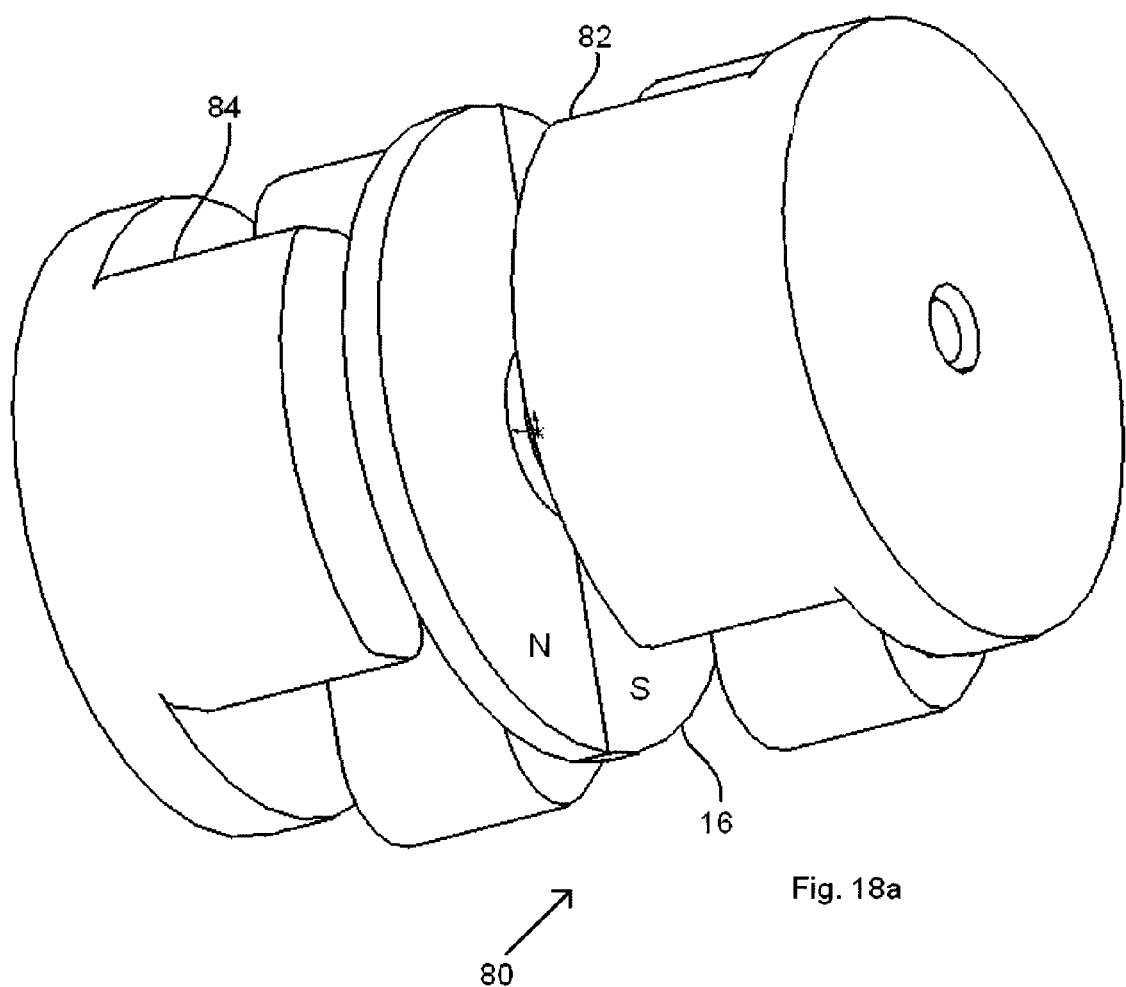
Figure 18B:
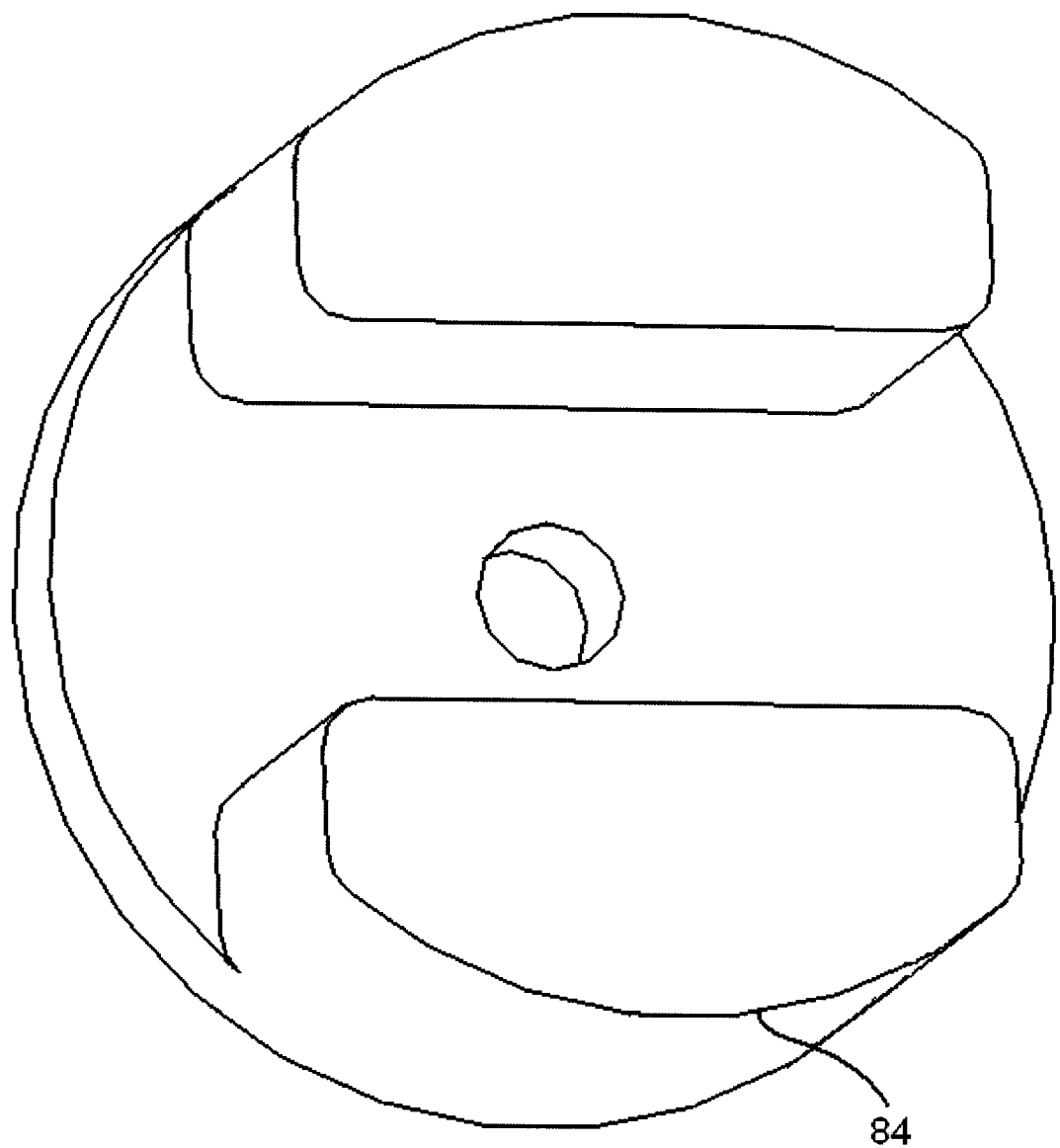
Figure 18C:
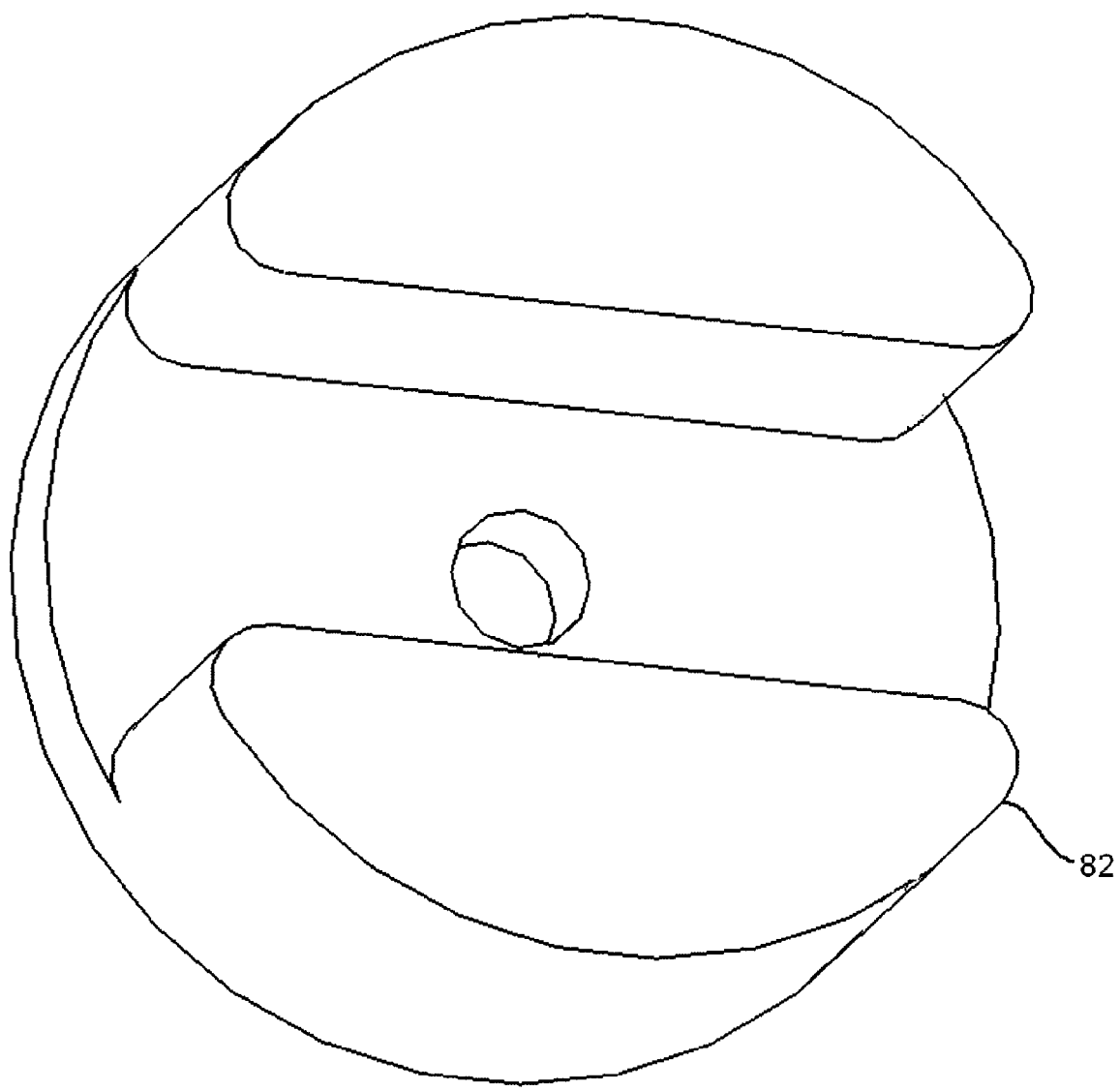

FIGS. 18*a*-18*c* show an asymmetric embodiment 80 of the invention. In the asymmetric embodiment as shown by comparing FIGS. 18*b* and 18*c*, the stator poles 82 on one side of the rotor 16 are larger than the stator poles 84 on the other side. This results in an axial attraction force on the rotor 40 toward the larger stator poles, which is useful to resist vibration from the user application. Although a 2 pole configuration is shown, the asymmetry can be similarly implemented in a 4 pole configuration.

Figure 19:
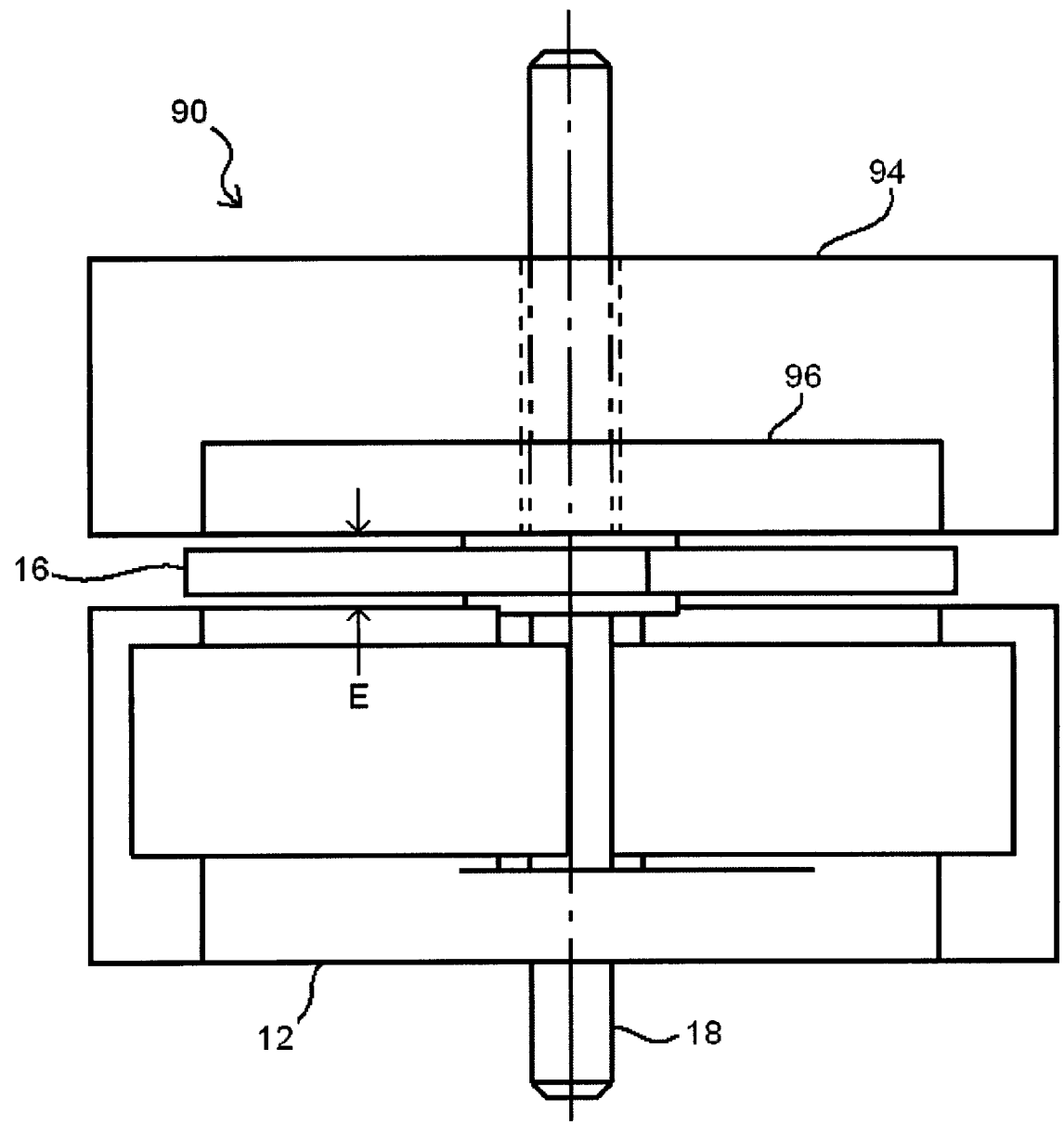
FIG. 19 is a view of an embodiment with an active stator on one side of the rotor and a passive stator in the form of a single plate on the opposite side of the rotor to close the magnetic circuit.
Figure 20:
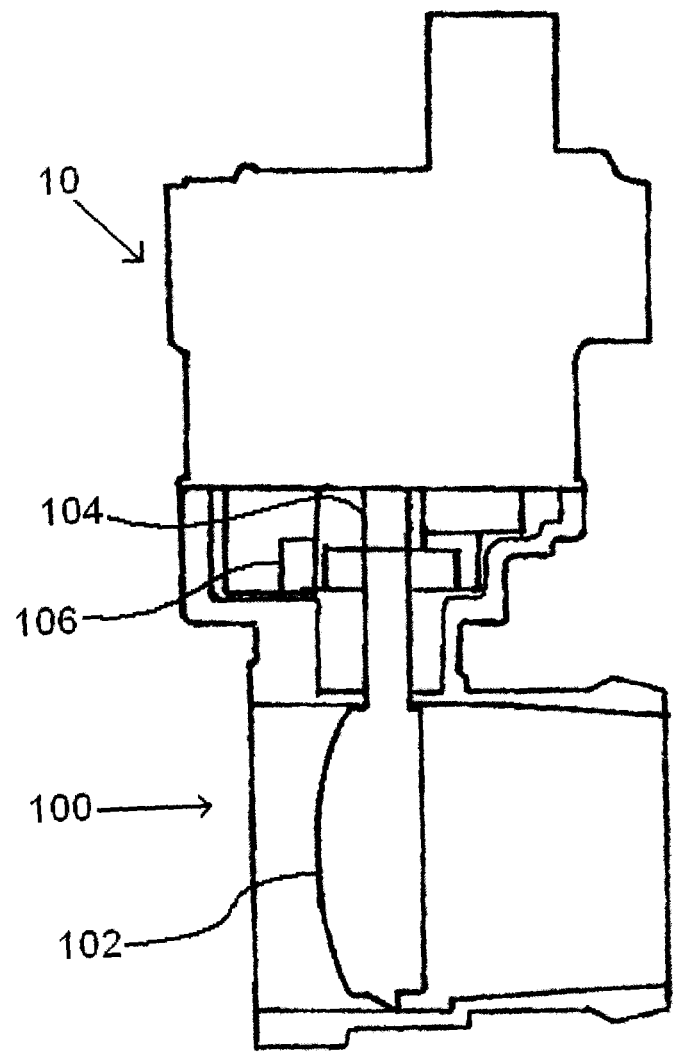
FIG. 20 is a view of an embodiment where the actuator is directly driving an air control valve in rotary motion.

FIG. 19 shows another embodiment 90 of the invention in which the rotor 16 has a stator assembly 12 on one side of the airgap E and a passive stator assembly 94 exemplified with a ferromagnetic plate 96 on the other side. This embodiment provides a lower cost actuator but with lower torque. The passive stator can be constructed in any form that has a surface opposite the end faces of the active stator assembly. For example a 2 pole stator without coils could be used. It can appreciated that with a passive stator the airgap dimension E is the distance between the end faces of the active stator poles and the opposite surface of the passive stator. This is shown in FIG. 19 in which the stator assembly 12 is on one side of the rotor 16 and a passive assembly 94 is on the opposite side with the plate 96 serving as the passive stator. The actuator may be attached to an operated device of the type in which the equipment directly drives the application in a rotary movement, or converts the rotation of the shaft to linear motion. FIG. 20 schematically shows the actuator 10 attached to an operated device 100 of the type in which an operated part 102 is directly rotated by the rotation of the shaft 104, along with a stop mechanism 106. This would be exemplified by an on-off butterfly air valve.

Either of the types of equipment, rotary or linear, can be used with the servo actuator version of the invention in which the amount of rotation or linear movement of the equipment and the amount of rotation of the rotor is sensed by the sensor and commands are given by a control system to change the rotational position of the rotor and consequently of the served equipment.

Examples of rotary control applications using the actuator's output torque are air or exhaust gas recirculation (EGR) control valves, turbocharger variable geometry vane or waste gate control, or throttles utilizing a "butterfly valve" configuration.

Rotary-to-linear motion may be accomplished via a "crank and slider" mechanism or by a rotating cam with a roller follower producing the linear motion and force. EGR valves of the pintle type and variable geometry turbochargers are examples of automotive applications that can utilize this invention.

These applications typically have a "home" position, maintained with no power applied to the actuator, and a powered end-of-stroke position where the application is at its maximum value. The invention will be controlled to take a position anywhere along the stroke, and will rapidly move back and forth along the stroke as commanded. A "fail safe" return spring is often incorporated in the application to return the actuator to its home position in the event of a power failure and when power is purposely shut down. In the absence of a return spring, the actuator can hold its end-of-stroke position, at either end, without power being applied.

Figure 21:
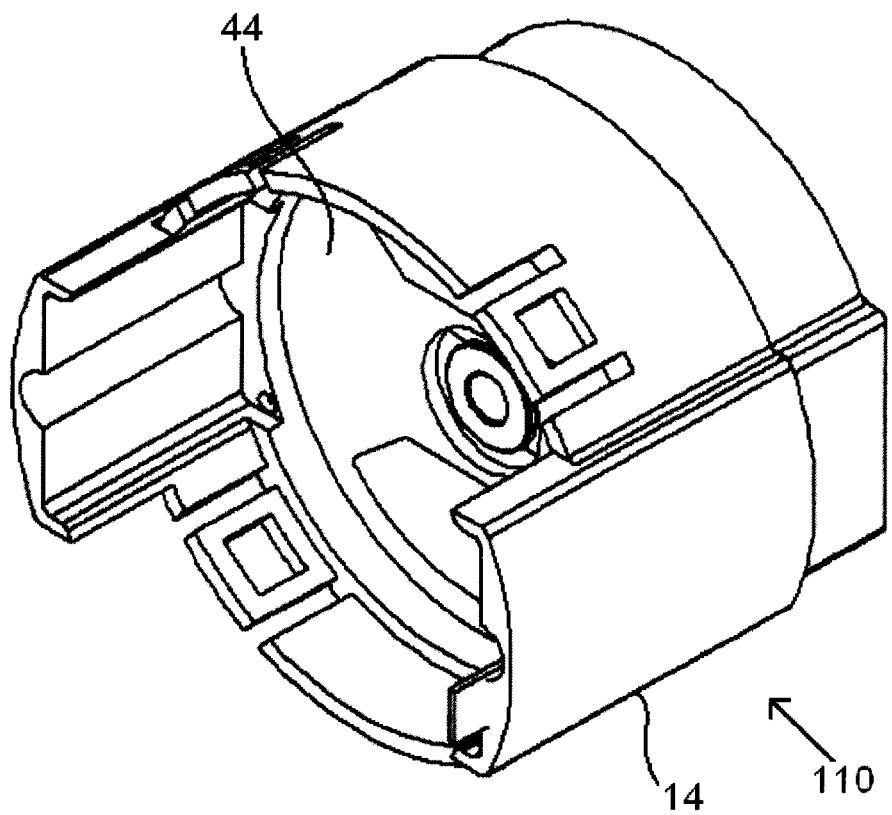
FIG. 21 is a view of an integrated stator assembly embodiment in which the overmolding of one stator is commonly molded with the coupling belt.

FIG. 21 illustrates an integrated version of the invention in which the overmolding 44 of the stator assembly is molded commonly with the belt 14 to create an integrated part 110 that is, the belt and stator assembly as an integrated structure. In this embodiment, the shaft, the rotor and the opposite stator assembly are conveniently assembled to the integrated part 110. This enables easy assembly and eliminates one dimensional tolerance variation in establishing the airgap space E.

FIG. 22 illustrates the embodiment of the belt 14 in which the lip is discontinuous as shown by the spaced apart lip segments 64.

The foregoing Detailed Description of exemplary and preferred embodiments is presented for purposes of illustration and disclosure in accordance with the requirements of the law. It is not intended to be exhaustive nor to limit the invention to the precise form or forms described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising step(s) for . . . ."

The invention claimed is:

1. A rotary single-phase electromagnetic actuator comprising:
   two stators with at least one of those stators being an active stator for generating a magnetic field, the active stator having a stator structure with two stator poles having two opposed inner parallel flat surfaces extending to a base and said other stator having two stator poles extending to a base, said two stator poles configured for single-phase activation, the two stators being axially spaced apart a predetermined distance defining an airgap with a dimension (E); wherein said two stator poles of said active stator are spaced apart a radial distance (D) separating said two opposed inner parallel flat surfaces along a direction perpendicular to said parallel flat surfaces such that a ratio of D to E (D/E) is in a range of 4 to 5;
   an inertia assembly comprising:
      a shaft defining an axis;
      a disc magnet rotor absent a yoke of high permeability magnetic material mounted on the shaft for rotating the shaft, the rotor magnet being axially magnetized with a plurality of pole pairs of alternating polarity;
   the rotor being in the airgap and spaced from each stator by a predetermined distance;
   wherein the two stators are configured and positioned relative to one another so as to establish, when said at least one active stator is energized, a closed-loop magnetic flux circuit that flows between the two stators through the stator poles, said base of the active stator, said base of the other stator and the rotor, and
   wherein the interaction between the rotor's magnetic field and the magnetic fields of said stators is capable of generating a torque delivered to the shaft so as to produce an angular stroke of equal to or less than 180 degrees.

2. The actuator of claim 1, further comprising stator assemblies in which said stators are incorporated and further comprising a nonmagnetic belt having an inward facing lip with first and second space-defining edge surfaces spaced apart a predetermined distance and the first and second space-defining edge surfaces being in contact with the stator assemblies on each side of the rotor to define said axial airgap of dimension (E) between the stators.

3. The actuator of claim 2 further comprising mating attachment members on the stator assemblies and on the belt to attach the belt to the stator assemblies.

4. The actuator of claim 3 wherein the mating members are cutout ears on the belt and engaging clips on the stator assemblies.

5. The actuator of claim 4 wherein the engaging clips engage the cutout ears so as to bias the stator assemblies against the edge surfaces of the lip.

6. The actuator of claim 2 wherein the lip is continuous.

7. The actuator of claim 2 wherein the lip is discontinuous.

8. The actuator of claim 1 wherein one of the two stators is an active stator on one side of the rotor and the other stator is a passive stator on the other side of the rotor.

9. The actuator of claim 1 wherein each of said two stators is an active stator and said closed-loop magnetic flux circuit is established upon activation of both of said active stators.

10. The actuator of claim 1 wherein said at least one active stator exhibits a U-shaped cross section extending between two spaced apart poles so as to generate U-shaped magnetic flux lines.

11. The actuator of claim 1 wherein a height H of said active stator is equal to or less than 8 times the airgap dimension.

12. The actuator of claim 1 wherein the height H is equal to or less than 6 times the airgap dimension.

13. The actuator of claim 1 further comprising a magnetic position sensor receiver disposed relative to the rotor so as to be sensitive to magnetic flux generated upon rotation of the rotor and wherein the rotor is configured such that a distance between the rotor and the magnetic position sensor varies as the rotor rotates.

14. The actuator of claim 13 wherein said rotor is non-circular.

15. The actuator of claim 13 wherein said rotor is elliptical.

16. The actuator of claim 1 wherein each of said two stators is an active stator and the two stators are configured such that the rotor experiences, when said stators are energized, a greater axial force in the direction of one of the stators than in direction of the other stator.

17. The actuator of claim 16 wherein a surface area of the poles of one of said active stators is greater than a respective surface area of the poles of the other active stator such that said rotor experiences said greater axial force in the direction of the stator having poles with the greater surface area.

18. The actuator of claim 1 wherein the rotor is positioned closer in the airgap to one stator than to the other stator.

19. The actuator of claim 1 wherein said actuator is configured such that the shaft provides an angular stroke in a range of 50 degrees to 130 degrees.

20. The actuator of claim 1 wherein said actuator is configured such the shaft provides an angular stroke in a range of 60 degrees to 110 degrees.

21. The actuator of claim 1 wherein said actuator is configured such that the shaft provides an angular stroke over a range of angles at a substantially constant torque.

22. The actuator of claim 1 wherein said disc rotor is attached to the shaft via a coupling member for applying its rotation to the shaft, thereby delivering said torque to the shaft.

23. The actuator of claim 1 wherein each of said stators comprises a high permeability ferromagnetic structure.

24. The actuator of claim 1 wherein said actuator is configured such the torque delivered to the shaft is proportional to a current applied to said at least one active stator.

25. The actuator of claim 1 wherein the poles of said at least one active stator are wound with wire such that said poles exhibit alternating magnetic polarity, when said at least one active stator is energized.

26. The rotary single-phase electromagnetic actuator of claim 1, wherein the actuator exhibits a figure of merit (AK) of at least 1000, wherein $$AK = \frac{K_m^2}{J_m},$$

wherein, $$K_m = \frac{T}{\sqrt{W}},$$

where T represents the actuator's output torque and W represents the input power, and $J_m$ is the sum of the rotor's inertia and the shaft's inertia.

27. A rotary single-phase electromagnetic actuator comprising:

an integrated stator assembly with a non magnetic belt, the belt comprising a lip and fastener elements, said lip providing a bearing surface, said integrated stator assembly comprising a first stator;

a second stator attached to the belt by the fastener elements and seated against the bearing surface to be separated by an airgap of predetermined dimension (E) from said first stator;

a shaft extending through the integrated stator assembly and the second stator to define an axis of rotation;

a disc magnet rotor absent a yoke of high permeability magnetic material disposed in said airgap and fixed to the shaft, with a plurality of pole pairs, the rotor being axially magnetized in alternating directions to rotate upon excitation of at least one of the stators, wherein at least one of said stators is an active stator for generating a magnetic field and having a stator structure with two stator poles having two opposed inner parallel flat surfaces extending to a base and said other stator having two stator poles extending to a base, said two stator poles configured for single-phase activation, wherein said two stator poles of said active stator are spaced apart a radial distance (D) separating said two opposed inner parallel flat surfaces along a direction perpendicular to said parallel flat surfaces such that a ratio of D to E (D/E) is in a range of 4 to 5, wherein the two stators are configured and positioned relative to one another so as to establish, when said at least one active stator is energized, a closed-loop magnetic flux circuit that flows between the two stators through poles of said stators, said base of the active stator, said base of the other stator, and the rotor, wherein the interaction between the rotor's magnetic field and the magnetic fields of said stators is capable of generating a torque delivered to the shaft so as to produce an angular stroke of equal to or less than 130 degrees.

28. The actuator of claim 27 further comprising a magnetic position sensor receiver disposed relative to the rotor so as to be sensitive to magnetic flux generated upon rotation of the rotor and wherein the rotor is configured such that a distance between the rotor and the magnetic position sensor varies as the rotor rotates.

29. The rotary single-phase electromagnetic actuator of claim 27, wherein the actuator exhibits a figure of merit (AK) of at least 1000, wherein $$AK = \frac{K_m^2}{J_m},$$

wherein, $$K_m = \frac{T}{\sqrt{W}},$$

where T represents the actuator's output torque and W represents the input power, and $J_m$ is the sum of the rotor's inertia and the shaft's inertia.

30. A control system comprising:
a rotary single-phase electromagnetic actuator comprising:
two stators with at least one of those stators being an active stator for generating a magnetic field, the active stator having a stator structure with two stator poles having two opposed inner parallel flat surfaces extending to a base and said other stator having two stator poles extending to a base, said two stator poles configured for single-phase activation, the two stators being axially spaced apart a predetermined distance defining an airgap with a dimension (E); wherein said two stator poles of said active stator are spaced apart a radial distance (D) separating said two opposed inner parallel flat surfaces along a direction perpendicular to said parallel flat surfaces such that a ratio of D to E (D/E) is in a range of 4 to 5;
an inertia assembly comprising:
a shaft defining an axis;
a disc magnet rotor absent a yoke of high permeability magnetic material mounted on the shaft for rotating the shaft, the rotor magnet being axially magnetized with a plurality of pole pairs of alternating polarity;
the rotor being in the airgap and spaced from each stator by a predetermined distance;
wherein the two stators are configured and positioned relative to one another so as to establish, when said at least one active stator is energized, a closed-loop magnetic flux circuit that flows between the two stators through the stator poles, said base of the active stator, said base of the other stator and the rotor, and the interaction between the rotor's magnetic field and the magnetic fields of said stators is capable of generating a torque delivered to the shaft; and
an application attached to the shaft of the actuator and having stops to limit rotation of the shaft within a predetermined constant torque range of the actuator.

31. The actuator of claim 30 further comprising a magnetic position receiver disposed relative to the rotor so as to be sensitive to magnetic flux generated upon rotation of the rotor and wherein the rotor is configured such that a distance between the rotor and the magnetic position sensor varies as the rotor rotates.

32. The rotary single-phase electromagnetic actuator of claim 30, wherein the actuator exhibits a figure of merit (AK) of at least 1000, wherein $$AK = \frac{K_m^2}{J_m},$$

wherein, $$K_m = \frac{T}{\sqrt{W}},$$

where T represents the actuator's output torque and W represents the input power, and $J_m$ is the sum of the rotor's inertia and the shaft's inertia.

33. A rotary single-phase electromagnetic actuator comprising:
two stators with at least one of those stators being an active stator for generating a magnetic field, the active stator having a stator structure with two poles and a base and two opposed flat inner parallel surfaces each of which extends from a face of one said poles to said base; wherein each of said two poles exhibits a generally D-shaped cross-sectional profile, said other stator having two stator poles extending to a base, said stators being axially apart in order to define magnetic flux circuit stated later in the claim a predetermined distance to form an airgap with a dimension (E) therebetween; said two opposed flat inner parallel surfaces being spaced apart a distance (D) separating said two opposed flat inner parallel surfaces along a direction perpendicular to said parallel flat surfaces such that a ratio of D to E (D/E) is in a range of 4 to 5,
a shaft defining an axis;
a disc magnet rotor absent a yoke of high permeability magnetic material mounted on the shaft for rotating the shaft, the rotor magnet being axially magnetized with a plurality of pole pairs of alternating polarity, the rotor being in the airgap;
wherein the two stators are configured and positioned relative to one another so as to establish, when said at least one active stator is energized, a closed-loop magnetic flux circuit that flows between the two stators through the stator poles, said base of the active stator, said base of the other stator, and the rotor;
wherein the interaction between the rotor's magnetic field and the magnetic fields of said stators is capable of generating a torque delivered to the shaft so as to produce an angular stroke of equal to or less than 180 degrees.

34. The rotary single-phase electromagnetic actuator of claim 33, wherein the actuator exhibits a figure of merit (AK) of at least 1000, wherein $$AK = \frac{K_m^2}{J_m},$$

wherein, $$K_m = \frac{T}{\sqrt{W}},$$

where T represents the actuator's output torque and W represents the input power, and $J_m$ is the sum of the rotor's inertia and the shaft's inertia.

35. The actuator of claim 33, wherein said stator structure is made of sintered powder metal.

36. The actuator of claim 33, wherein the actuator is configured such that the shaft provides an angular stroke of equal to or less than 180 degrees.

37. The actuator of claim 33, wherein said actuator is configured such that the shaft provides an angular stroke in a range of 50 degrees to 130 degrees.

38. The actuator of claim 33, wherein said actuator is configured such the shaft provides an angular stroke in a range of 60 degrees to 110 degrees.

39. The actuator of claim 33, wherein said actuator is configured such that the shaft provides an angular stroke over a range of angles at a substantially constant torque.

* * * * *